United States Patent
Galsworthy et al.

(10) Patent No.: US 12,422,022 B2
(45) Date of Patent: Sep. 23, 2025

(54) AUTOMATED SEQUENTIAL TRANSMISSIONS

(71) Applicant: Polaris Industries Inc., Medina, MN (US)

(72) Inventors: David A. Galsworthy, Wyoming, MN (US); Gary A. Pinkley, Lino Lakes, MN (US); Adrien Lechat, Hinckley (GB); Zacharey J. Hussong, Roseville, MN (US); Jeffrey I. Peterman, Stacy, MN (US)

(73) Assignee: POLARIS INDUSTRIES INC., Medina, MN (US)

( * ) Notice: Subject to any disclaimer, the term of this patent is extended or adjusted under 35 U.S.C. 154(b) by 0 days.

(21) Appl. No.: 17/893,309

(22) Filed: Aug. 23, 2022

(65) Prior Publication Data

US 2022/0397183 A1 Dec. 15, 2022

Related U.S. Application Data

(62) Division of application No. 16/933,076, filed on Jul. 20, 2020, now Pat. No. 11,454,301.

(60) Provisional application No. 62/879,161, filed on Jul. 26, 2019.

(51) Int. Cl.
*F16H 3/00* (2006.01)
*F16H 3/093* (2006.01)
*F16H 61/688* (2006.01)
*F16H 63/18* (2006.01)

(52) U.S. Cl.
CPC ............ *F16H 3/006* (2013.01); *F16H 3/093* (2013.01); *F16H 61/688* (2013.01); *F16H 63/18* (2013.01); *F16H 2200/0052* (2013.01)

(58) Field of Classification Search
CPC ........ F16H 3/006; F16H 3/093; F16H 61/688; F16H 63/18; F16H 2200/0052
See application file for complete search history.

(56) References Cited

U.S. PATENT DOCUMENTS

| | | | | |
|---|---|---|---|---|
| 7,487,691 B2* | 2/2009 | Kapp | ...................... | F16H 63/18 74/473.21 |
| 8,522,635 B2* | 9/2013 | Pastorello | ............... | F16H 61/32 74/330 |
| 10,160,453 B1* | 12/2018 | Brandstaetter | ...... | B60W 10/107 |
| 11,285,807 B2* | 3/2022 | Galsworthy | ............ | B60K 17/08 |
| 2002/0088289 A1* | 7/2002 | Bowen | .................. | F16H 63/304 74/331 |
| 2009/0193919 A1* | 8/2009 | Bender | ................. | F16H 3/0915 74/336 R |

(Continued)

FOREIGN PATENT DOCUMENTS

| | | | | |
|---|---|---|---|---|
| JP | 2018-105427 A | 7/2018 | | |
| WO | WO-2011139264 A2 * | 11/2011 | ............. | B60K 23/00 |
| WO | WO-2014187457 A1 * | 11/2014 | ............. | F16H 61/32 |

OTHER PUBLICATIONS

International Preliminary Report on Patentability issued by the International Bureau of WIPO, dated Feb. 1, 2022, for International Patent Application No. PCT/US2020/042755; 7 pages.

(Continued)

*Primary Examiner* — Victor L MacArthur
(74) *Attorney, Agent, or Firm* — SCHWEGMAN LUNDBERG & WOESSNER, P.A.

(57) ABSTRACT

A driveline assembly for a recreational vehicle may include an engine and an automated sequential transmission.

19 Claims, 34 Drawing Sheets

(56) References Cited

U.S. PATENT DOCUMENTS

| | | | |
|---|---|---|---|
| 2010/0186532 A1* | 7/2010 | Stefina | F16H 63/36 74/473.24 |
| 2011/0100144 A1 | 5/2011 | Neelakantan et al. | |
| 2013/0091984 A1* | 4/2013 | Pesola | B60K 6/36 903/902 |
| 2014/0083228 A1* | 3/2014 | Mitsubori | F16H 63/18 74/473.36 |
| 2014/0297086 A1* | 10/2014 | Matsuda | B62K 25/283 701/22 |
| 2014/0336858 A1* | 11/2014 | Matsushima | B62M 11/06 701/22 |
| 2014/0343807 A1* | 11/2014 | Maki | F16H 63/3458 701/51 |
| 2015/0176706 A1* | 6/2015 | Saitoh | F16H 63/18 74/473.36 |
| 2016/0146344 A1 | 5/2016 | Tsukamoto et al. | |
| 2018/0135751 A1* | 5/2018 | Maki | F16H 63/32 |
| 2018/0328487 A1 | 11/2018 | Nishimoto et al. | |
| 2019/0210457 A1 | 7/2019 | Galsworthy et al. | |
| 2020/0158234 A1 | 5/2020 | Kwon et al. | |
| 2020/0166103 A1* | 5/2020 | Kontopoulos | F16H 55/17 |
| 2020/0166127 A1 | 5/2020 | Kwon et al. | |
| 2020/0166132 A1 | 5/2020 | Kwon et al. | |
| 2020/0325987 A1 | 10/2020 | Nishimoto et al. | |
| 2021/0025480 A1 | 1/2021 | Galsworthy et al. | |

OTHER PUBLICATIONS

International Search Report and Written Opinion received for PCT Patent Application No. PCT/US2020/042755, mailed on Dec. 10, 2020, 16 pages.

* cited by examiner

AUTOMATED SEQUENTIAL TRANSMISSIONS

CROSS-REFERENCE TO RELATED APPLICATION

This application is a divisional of U.S. patent application Ser. No. 16/933,076, filed Jul. 20, 2020, which claims the benefit of U.S. Provisional Patent Application No. 62/879,161, filed Jul. 26, 2019, titled AUTOMATED SEQUENTIAL TRANSMISSIONS, the entire disclosures of which are expressly incorporated by reference herein.

FIELD OF THE DISCLOSURE

The present application relates to transmissions and, more particularly, to automated sequential transmissions.

BACKGROUND OF THE DISCLOSURE

In some instances, a vehicle may include an engine and a transmission operably coupled to the front and/or rear wheels to provide motive power to drive the vehicle. The engine may have a plurality of cylinders and is configured to provide a maximum horsepower based on the parameters and specifications of the vehicle. The engine is operably coupled to the transmission.

The automated sequential transmission (AST) is configured as a manual transmission that shifts between or changes gears through sensors, pneumatics, and/or actuators rather than a clutch pedal. Further, the AST is configured to shift through the gears sequentially (e.g., one at a time). For example, the AST may include multiple different gear ratios and positions, and the AST sequentially switches from a first gear position to a second gear position then to a third gear position and so on. In some examples, due to the sequential nature of the AST, a failure caused by the second gear position may prevent the vehicle from switching from the first gear position to the third gear position. As such, there is a need for an improvement to the traditional AST systems to allow smooth transitions between different gear positions.

SUMMARY OF THE DISCLOSURE

In an exemplary embodiment of the present disclosure, an automatic sequential transmission (AST) is provided. The AST comprises a shift fork moveable between a plurality of gear shift positions, a first drum operably coupled to the shift fork and configured to move between the one or more gear shift positions based on a control input, and a second drum operably coupled to the first drum and the shift fork, wherein the second drum is configured to move between a first position and a second position relative to the first drum based on the shift fork encountering a block-out event.

In some examples, the AST further comprises a biasing member, the biasing member biasing the second drum towards the first position. In some instances, the biasing member is supported by the first drum. In some variations, the second drum is a sleeve and the first drum is received in an interior of the second drum. In some examples, the shift fork is operatively coupled to the first drum and the second drum through a pin. In some instances, the pin is positioned in a first track of the first drum and a second track of the second drum. In some variations, the first drum rotates around an axis based on the control input indicating a change from a first gear shift position to a second gear shift position. In some instances, the second drum translates along the axis in response to the first actuator rotating around the axis and the occurrence of the block-out event.

In some examples, the AST further comprises an interface operably coupled to the shift fork. The interface is able to engage a first gear corresponding to the first gear shift position and a second gear corresponding to the second gear shift position in response to the control input indicating a gear shift change. The block-out event occurs in response to the interface failing to engage the first gear or the second gear in response to the control input indicating the gear shift change. In some instances, the interface comprises one or more dog pockets. Further, each of the first gear and the second gear comprise one or more shift pegs. Also, the block-out event occurs based on the one or more dog pockets failing to engage with the one or more shift pegs of the first gear or the second gear.

In another exemplary embodiment of the present disclosure, an automatic sequential transmission (AST) is provided. The AST comprises a shift fork configured to select an operational gear through a translation along a first direction, a first actuator operably coupled to the shift fork, wherein the first actuator rotates around an axis oriented along the first direction based on a control input indicating a change from a first gear shift position to a second gear shift position, and a second actuator operably coupled to the first actuator and the shift fork, wherein the second actuator translates horizontally on the axis in response to the first actuator rotating around the axis.

In some instances, the first actuator is a first drum and the second actuator is a second drum. In some examples, the AST further comprises a biasing member. The biasing member biases the second drum towards a first position relative to the first drum. In some variations, the biasing member is supported by the first drum. In some instances, the second drum is a sleeve and the first drum is received in an interior of the second drum. In some examples, the shift fork is operatively coupled to the first drum and the second drum through a pin. In some variations, the pin is positioned in a first track of the first drum and a second track of the second drum.

In another exemplary embodiment of the present disclosure, an automatic sequential transmission (AST) is provided. The AST comprises a plurality of gears, wherein the plurality of gears are selectable to provide a plurality of gear ratios, a first rotating member operatively coupled to a first subset of the plurality of gears and configured to rotate between a plurality of high speed gear shift positions, and a second rotating member operatively coupled to a second subset of the plurality of gears and configured to rotate between a plurality of low speed gear shift positions.

In some instances, the AST further comprises a first shiftable member operably coupled to the first rotating member. The first shiftable member comprises a first interface that engages with a reverse gear, of the first subset of the plurality of gears, in response to the first rotating member being in a reverse gear shift position, of the plurality of high speed gear shift positions. In some examples, the first interface disengages with the reverse gear in response to the first rotating member moving from the reverse gear shift position, of the plurality of high speed gear shift positions, to a different gear shift position. In some variations, the first interface of the first shift fork engages with a first forward gear, of the first subset of the plurality of gears, in response to the first rotating member being in a first forward gear shift position, of the plurality of high speed gear shift positions.

In some instances, the first interface of the first shift fork disengages with the first forward gear, of the first subset of the plurality of gears, in response to the first rotating member moving from the first forward gear shift position, of the plurality of high speed gear shift positions, to a different gear shift position. In some examples, the AST further comprises a second shiftable member operably coupled to the second rotating member. The second shiftable member comprises a second interface that engages with a park gear, of the second subset of the plurality of gears, in response to the second rotating member being in a park gear shift position, of the plurality of low speed gear shift positions.

In some variations, the second interface disengages with the park gear, of the second subset of the plurality of gears, in response to the second rotating member moving from the park gear shift position, of the plurality of low speed gear shift positions, to a different gear shift position. In some instances, the second interface of the second shift fork engages with a neutral gear, of the second subset of the plurality of gears, in response to the second rotating member being in a neutral gear shift position, of the plurality of low speed gear shift positions. In some examples, the second interface of the second shift fork disengages with the neutral gear, of the second subset of the plurality of gears, in response to the second rotating member moving from the neutral gear shift position, of the plurality of low speed gear shift positions, to a different gear shift position.

In some examples, the first subset of the plurality of gears comprises a reverse gear, a first forward gear, a second forward gear, a third forward gear, a fourth forward gear, and a fifth forward gear. The plurality of high speed gear shift positions comprises a reverse gear shift position, a first forward gear shift position, a second forward gear shift position, a third forward gear shift position, a fourth forward gear shift position, and a fifth forward gear shift position. In some instances, the second subset of the plurality of gears comprises a park gear, a neutral gear, a high range gear, a low range gear. The plurality of low speed gear shift positions comprises a park gear shift position, a neutral speed gear shift position, a high range speed gear shift position, and a low range speed gear shift position. In some variations, the AST further comprises a first shift actuator operatively coupled to the first rotating member and configured to rotate the first rotating member in response to a first control input, and a second shift actuator operatively coupled to the second rotating member and configured to rotate the second rotating member in response to a second control input.

In another exemplary embodiment of the present disclosure, an automatic sequential transmission (AST) is provided. The AST comprises a transmission housing, a transmission input shaft accessible from an exterior of the transmission housing, a clutch operatively coupled to the transmission input shaft, and a hydraulic control unit (HCU), wherein at least a portion of the HCU is positioned vertically higher than a horizontal center of the clutch.

In some instances, a majority of the HCU is positioned above the horizontal center of the clutch. In some examples, the entire HCU is positioned above the horizontal center of the clutch. In some variations, the HCU is positioned directly above the clutch.

In another exemplary embodiment of the present disclosure, an automatic sequential transmission (AST) is provided. The AST comprises a transmission housing, a transmission input shaft accessible from an exterior of the transmission housing, an assembly operatively coupled to the transmission input shaft, the assembly being driven by the transmission input shaft, and an oil pump operatively coupled to the assembly, the oil pump being driven by the assembly.

In some instances, the AST further comprises a plurality of gears. The transmission input shaft includes a clutch input shaft, and a clutch output shaft selectively engagable with the clutch input shaft. The assembly is operatively coupled to the clutch input shaft. In some examples, the assembly comprises a drive member operatively coupled to the transmission input shaft, a driven member operatively coupled to the oil pump, and a connecting member connecting the drive member to the driven member. In some variations, the drive member is a clutch mounted sprocket. The driven member is an oil pump mounted sprocket. The connecting member is a chain connecting the clutch mounted sprocket to the oil pump mounted sprocket.

In some instances, the oil pump comprises an oil pump shaft operatively coupled to the oil pump sprocket. A rotation of the transmission input shaft drives a rotation of the oil pump shaft. In some examples, the AST further comprises a clutch operatively coupled to the transmission input shaft, and wherein the assembly is coupled to the transmission input shaft prior to the clutch such that a rotation of the transmission input shaft drives the rotation of the oil pump shaft even if the clutch is disengaged. In some variations, the AST further comprises a clutch operatively coupled to the transmission input shaft, wherein the oil pump is positioned outside of an envelope of the clutch. In some instances, at least a portion of the oil pump is positioned below the clutch. In some examples, at least a portion of the oil pump is positioned directly below the clutch.

In another exemplary embodiment of the present disclosure, an automatic sequential transmission (AST) is provided. The AST comprises a shift fork moveable between a plurality of gear shift positions, a first concentric drum operably coupled to the shift fork and configured to move between the one or more gear shift positions based on a control input, and a second concentric drum operably coupled to the first concentric drum and the shift fork, wherein the second concentric drum is configured to move between a first position and a second position relative to the first concentric drum.

In some instances, the second concentric drum is configured to move between the first position and the second position based on the shift fork encountering a block-out event. In some examples, the second concentric drum is moved axially along a longitudinal axis between the first position and the second position.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where.

Figure 1:
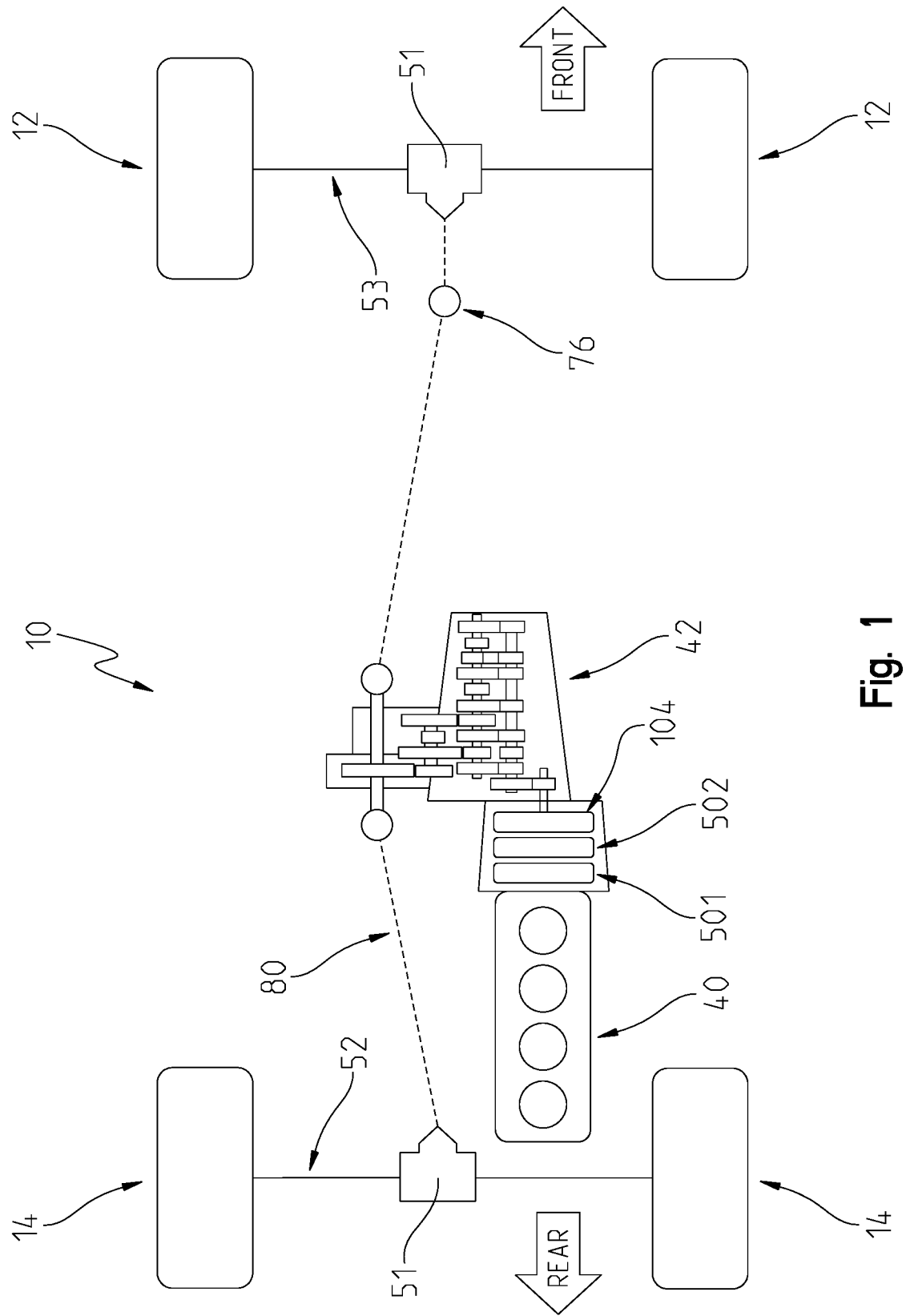
FIG. 1 shows a representative view of an exemplary vehicle.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as other all-terrain vehicles, motorcycles, snowmobiles, and golf carts.

The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

In some instances throughout this disclosure and in the claims, numeric terminology, such as first, second, third, and fourth, is used in reference to various components or features. Such use is not intended to denote an ordering of the components or features. Rather, numeric terminology is used to assist the reader in identifying the component or features being referenced and should not be narrowly interpreted as providing a specific order of components or features.

Referring to FIG. 1, an illustrative embodiment of a recreational vehicle 10 is shown which is configured to traverse a variety of terrains, including mud, rocks, dirt, and other trail or off-road conditions. Vehicle 10 may be a utility vehicle ("UV"), but the transmission described herein may also be applicable to other recreational vehicles. More particularly, vehicle 10 may be configured for military, industrial, agricultural, or recreational applications. For example, in some instances, the vehicle 10 may be a four wheeled vehicle, an all-terrain vehicle (ATV), a utility vehicle, a three wheeled motorcycle type vehicle (e.g., the POLARIS SLINGSHOT), a two wheeled vehicle such as a motorcycle, and/or a snowmobile.

Additional details regarding the different types of the vehicle 10 are provided in U.S. Pat. No. 8,827,019 (filed Dec. 18, 2013, titled SIDE-BY-SIDE VEHICLE), U.S. Pat. No. 9,211,924 (filed Mar. 25, 2014, titled SIDE-BY-SIDE VEHICLE), U.S. Pat. No. 8,544,587 (filed Mar. 21, 2012, titled THREE-WHEELED VEHICLE), U.S. application Ser. No. 15/387,504 (filed Dec. 21, 2016, titled TWO-WHEELED VEHICLE), U.S. Pat. No. 9,738,134 (filed Jun. 23, 2016, titled UTILITY VEHICLE), U.S. Pat. No. 9,623,912 (filed Sep. 20, 2013, titled UTILITY VEHICLE), U.S. Pat. No. 10,118,477 (filed Jun. 5, 2017, titled HYBRID UTILITY VEHICLE), U.S. application Ser. No. 16/152,719 (filed Oct. 5, 2018, titled HYBRID UTILITY VEHICLE), U.S. Pat. No. 10,183,605 (filed May 13, 2016, titled UTILITY VEHICLE), U.S. application Ser. No. 15/631,874 (filed Jun. 23, 2017, titled SIDE-BY-SIDE VEHICLE), U.S. Pat. No. 9,789,909 (filed Mar. 14, 2014, titled UTILITY VEHICLE), and U.S. Pat. No. 9,809,195 (filed Nov. 22, 2013, titled SNOWMOBILE), all assigned to the present assignee, the entire disclosures of which are expressly incorporated by reference herein.

The vehicle 10 includes a plurality of ground-engaging members 12, 14 (e.g., front and/or rear tires/wheels), front axles 53, rear axles 52, right angles drives 51, a front prop shaft 72, a rear prop shaft 80, a transmission 42 (e.g., an automated sequential transmission), a clutch 104, a flywheel 501, a damper 502, and/or a prime mover 40 (e.g., 4 cylinder engine). The components of the vehicle 10 will be described in further detail below.

Additionally, and/or alternatively, in examples where the vehicle 10 is a utility vehicle, the vehicle 10 may include a plurality of body panels coupled to frame assembly, a front suspension assembly supported by a front portion of frame assembly, a rear suspension assembly supported by a rear frame portion of frame assembly, and a rear cargo area supported by the rear frame portion of frame assembly. The vehicle may extend between front and rear ground-engaging members 12, 14 in a longitudinal direction along a longitudinal vehicle centerline L. The front ground-engaging members 12 may include a wheel assembly and a tire extending radially about wheel assembly. Similarly, rear ground-engaging members 14 may include a wheel assembly and a tire extending radially about wheel assembly. In one embodiment, one or more ground-engaging members 12, 14 may be replaced with tracks, such as the PROSPECTOR II tracks available from Polaris Industries, Inc. located at 2100 Highway 55 in Medina, Minn. 55340, or non-pneumatic tires as disclosed in any of U.S. Pat. No. 8,109,308, filed on Mar. 26, 2008; U.S. Pat. No. 8,176,957, filed on Jul. 20, 2009; and U.S. Pat. No. 9,108,470, filed on Nov. 17, 2010; and U.S. Patent Application Publication No. 2013/0240272, filed on Mar. 13, 2013, the complete disclosures of which are expressly incorporated by reference herein.

The vehicle 10 may include an operator area supported by frame assembly and which includes seating for at least an operator. In some examples, the vehicle 10 may include a first seating portion, illustratively an operator seat, and a second seating portion, illustratively a front passenger seat. More particularly, the operator seat and front passenger seat may be in a side-by-side arrangement, however, operator seat and passenger seat may be in a longitudinal arrangement or in any configuration of seats positioned adjacent each other or longitudinally spaced apart from each other. In some variations, the vehicle 10 may include multiple passenger seats positioned rearward of operator seat. The operator seat may be a bucket seat and may include a seat bottom and a seat back. Similarly, front passenger seat may include a seat bottom and a seat back. Additional details of vehicle 10 are disclosed in U.S. patent application Ser. No. 14/051,700, filed Oct. 11, 2013; U.S. patent application Ser. No. 14/477,589, filed Sep. 4, 2014; and U.S. patent application Ser. No. 14/577,908, filed Dec. 19, 2014; the complete disclosures of which are expressly incorporated by reference herein.

Figure 2:
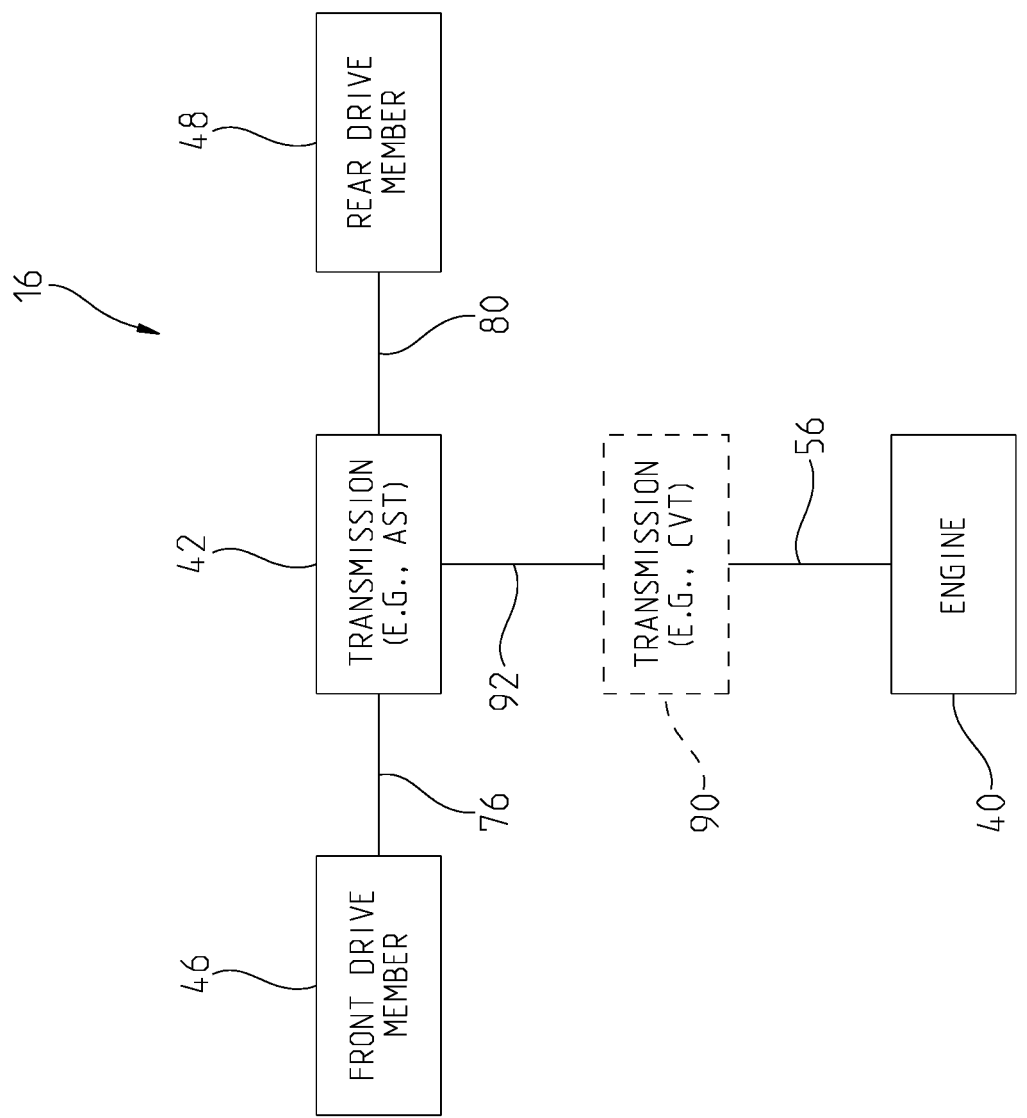
FIG. 2 shows an exemplary block diagram of a driveline assembly from the exemplary vehicle of FIG. 1.

Referring to FIG. 2, a block diagram of a driveline assembly 16 is disclosed. The driveline assembly 16 is incorporated within the vehicle 10 and includes a prime mover, illustratively an engine 40, a first transmission 90 (e.g., a continuous variable transmission (CVT), a second transmission 42 (e.g., the AST), a front drive member 46, and a rear drive member 48. The front drive member 46 may include the front prop shaft 76, a right angle drive 51, front axles 53, and/or the front ground-engaging members 12 (e.g., front tire/wheels). The rear drive member 48 may include the rear prop shaft 80, rear axles 52, a right angle drive 51, and/or the rear ground-engaging members 14 (e.g., rear tire/wheels).

Prime mover 40 may be an internal combustion engine, an electric motor, or any other type of engine or motor configured to provide motive power for vehicle 10. The engine 40 includes a crankcase or outer housing (not shown) configured to support and drive rotation of an output shaft 56. The engine 40 also includes one or more cylinders coupled to crankcase and extending upwardly therefrom. The engine 40 may be configured to operate with any type of fuel, such as gasoline, diesel, natural gas, etc.

Output shaft 56 of engine 40 which operably or drivingly couples engine 40 to the CVT 90 and/or the AST 42. In embodiments, output shaft 56 is coupled to CVT 90 which is in turn coupled to AST 42. For example, an input 106 of the AST 42 (shown in FIGS. 6 and 7 below) operably couples together the CVT 90 to the AST 42. The AST 42 is shown and described in further detail below. In embodiments, CVT 90 is optional and engine 40 is operatively coupled to AST 42 without an intermediate CVT 90.

A front prop shaft 76 extends between the AST 42 and the front drive member 46 and is operably coupled thereto to provide power to the front drive member 46 for driving front ground-engaging members 12. In some instances, the front prop shaft 76 may be defined as a single shaft or may include multiple shafts operably coupled together. A rear prop shaft 80 extends between the AST 42 and rear drive unit 48 and is operably coupled thereto to provide power to rear drive member 48 for driving rear ground-engaging members 14. In some instances, the rear prop shaft 80 may be defined as a single shaft or may include a plurality of shafts operably coupled together.

Figure 3:
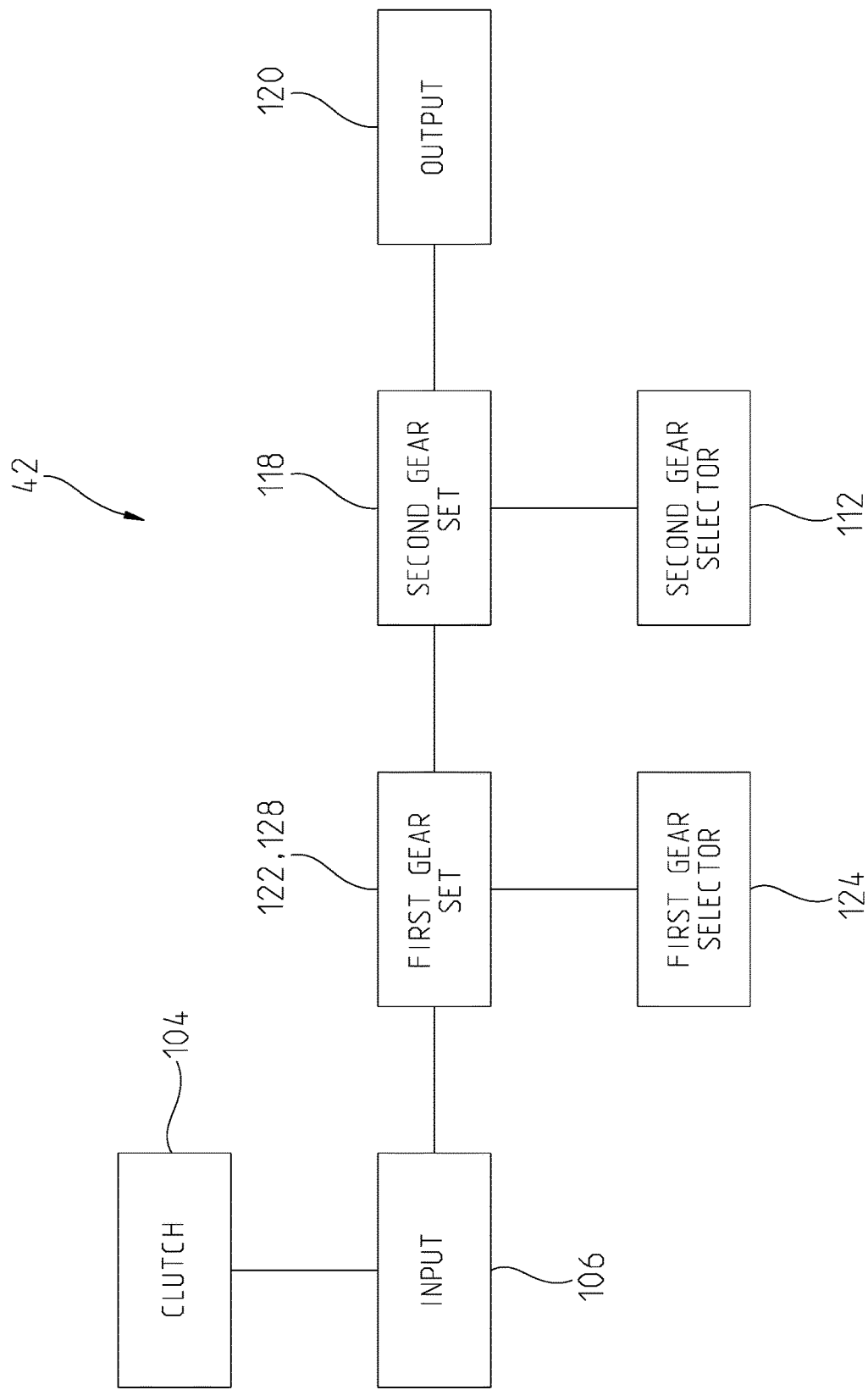
FIG. 3 shows an exemplary block diagram of one or more components of the AST.
Figure 4:
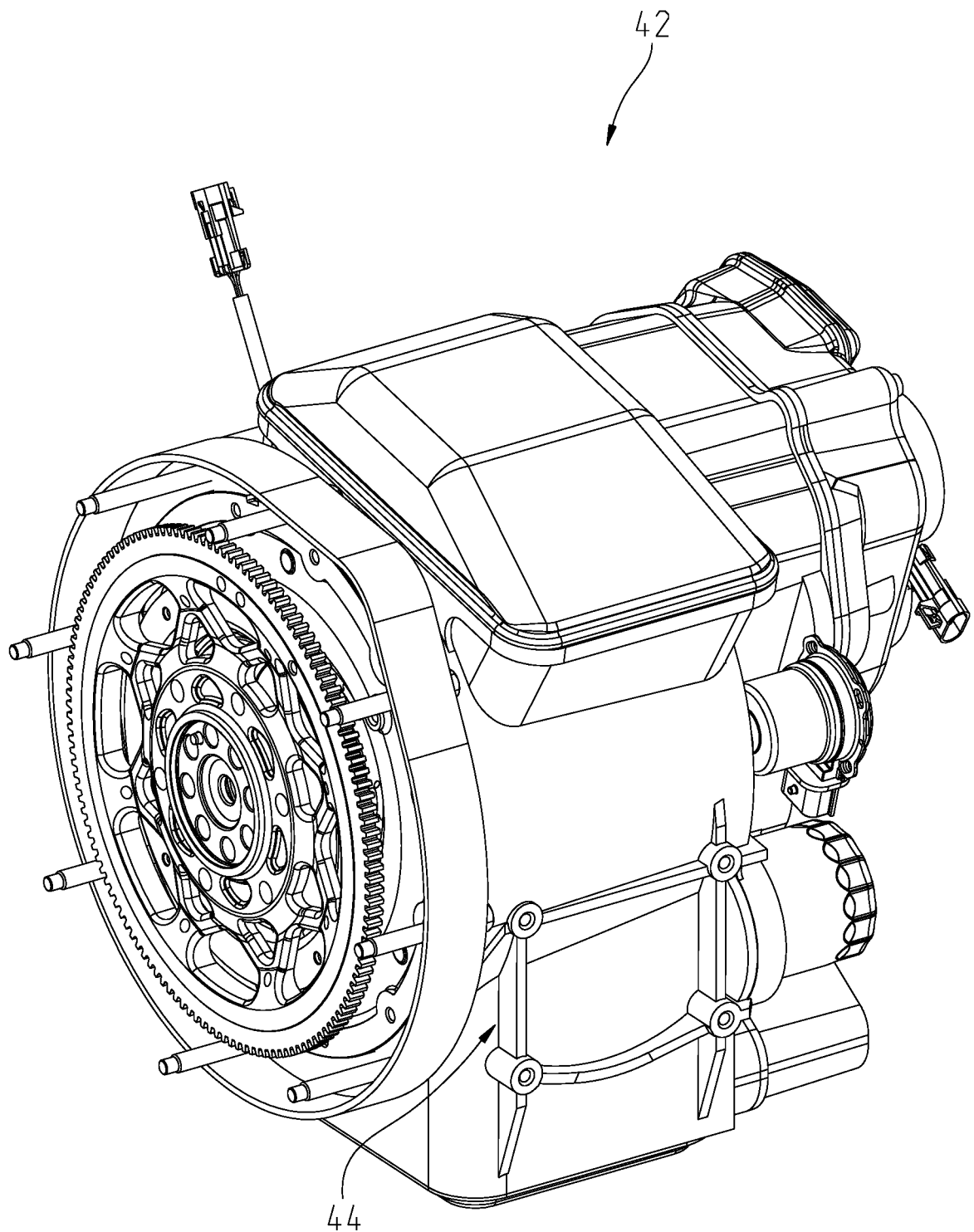
FIG. 4 shows a front perspective of the AST.
Figure 5:
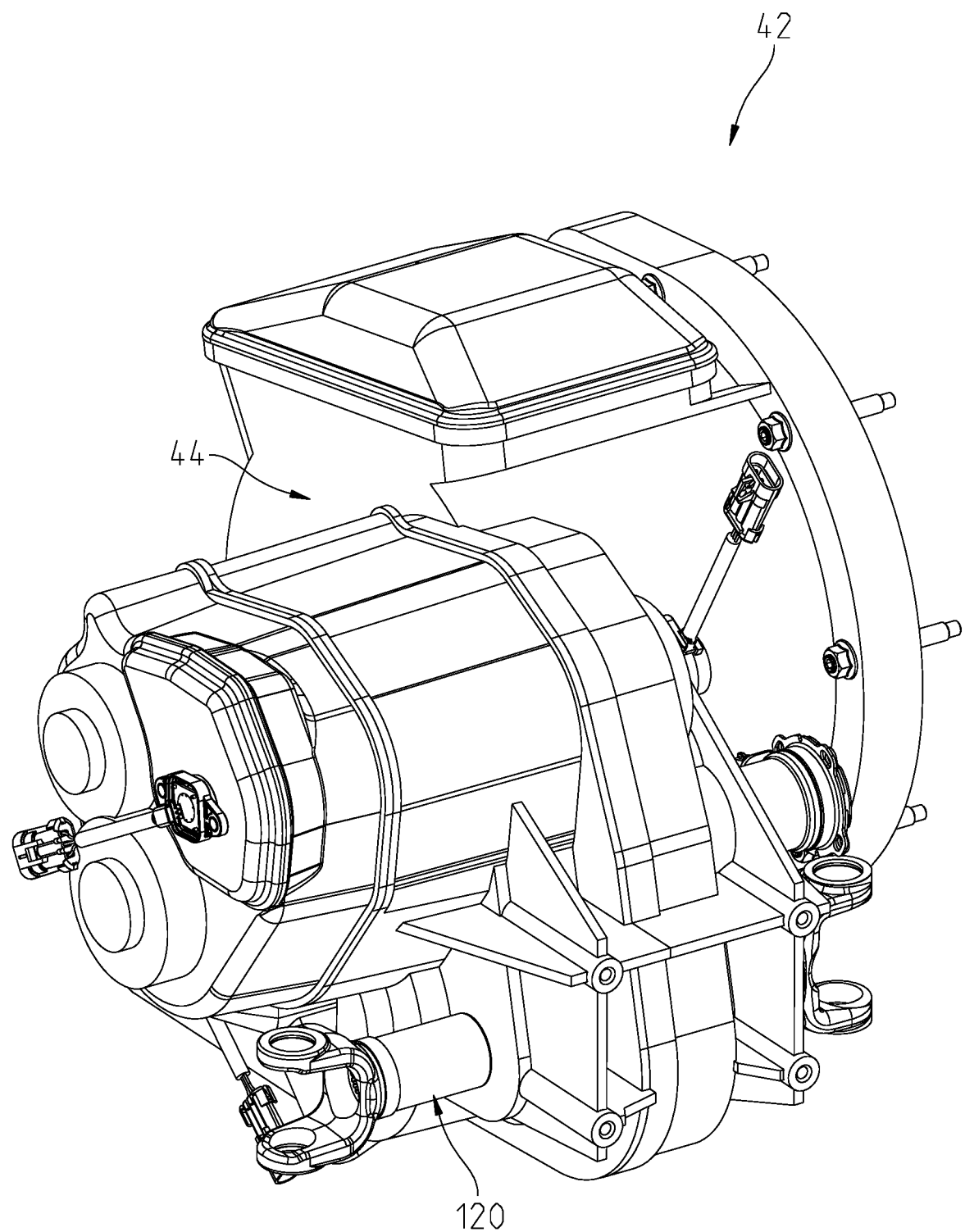
FIG. 5 shows a rear perspective of the AST.
Figure 6:
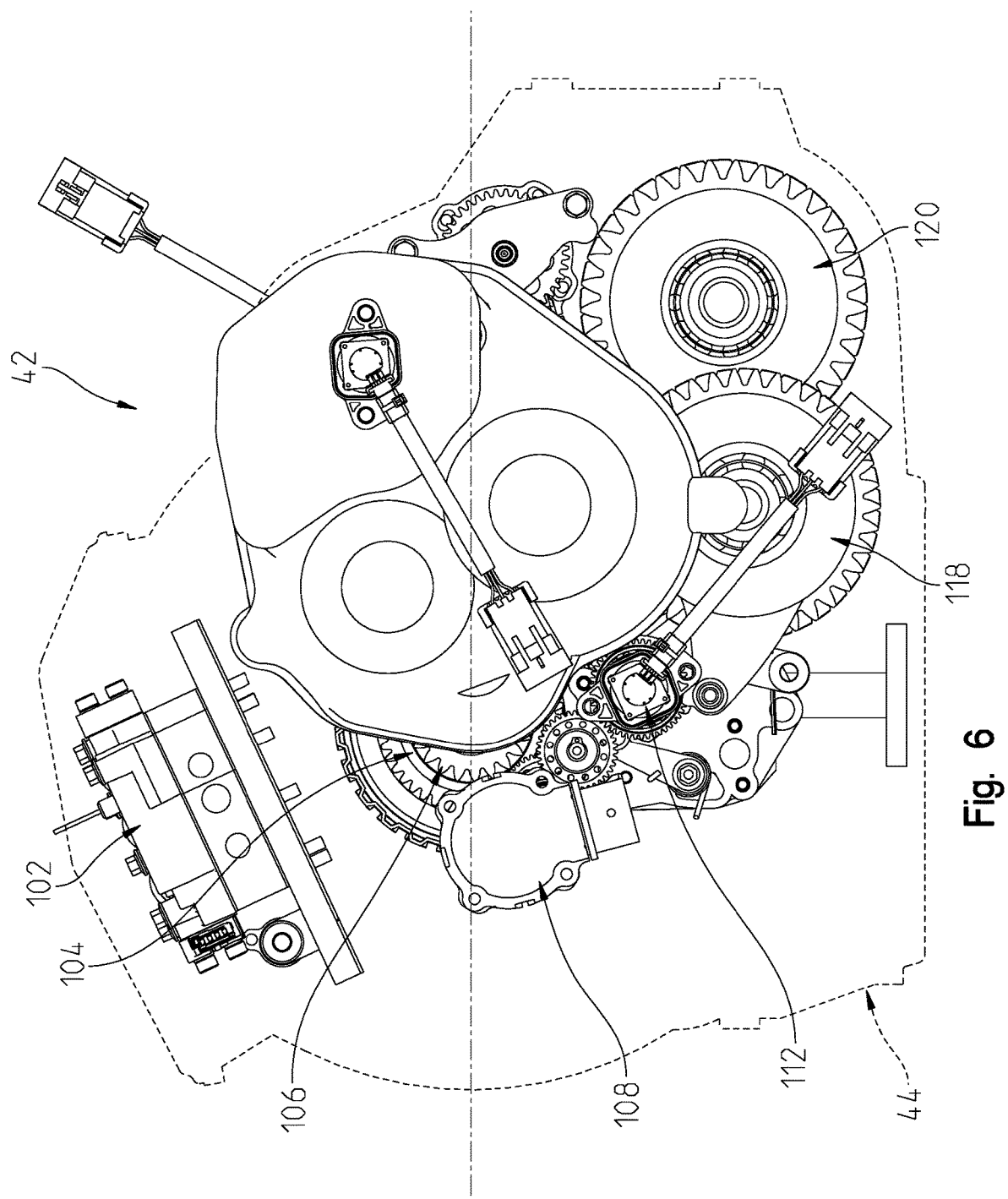
FIG. 6 shows a first side cross sectional view of the AST.
Figure 7:
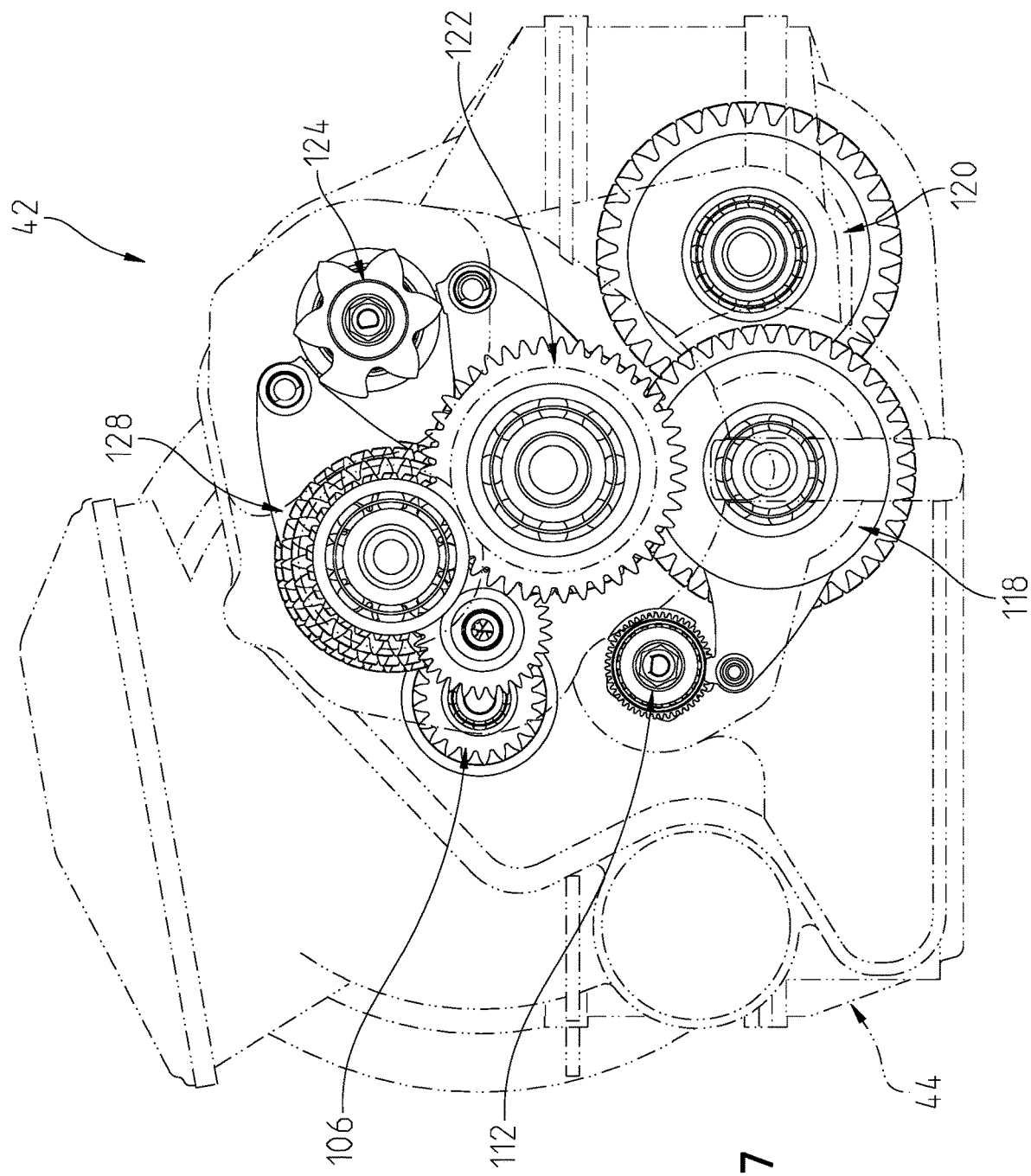
FIG. 7 shows a second side cross sectional view of the AST.
Figure 8:
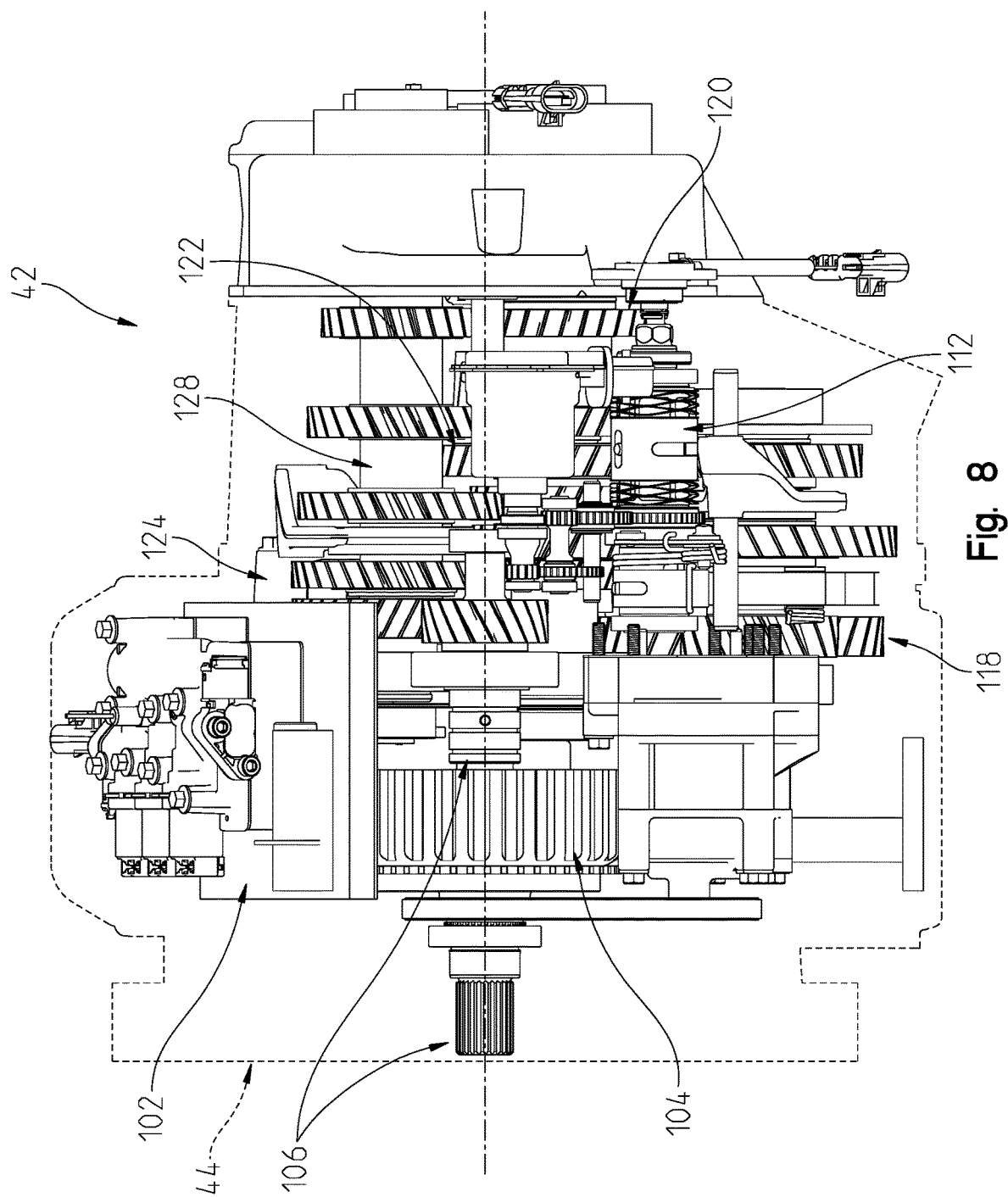
FIG. 8 shows a top perspective of the AST.

FIG. 3 shows an exemplary block diagram of one or more components of the AST 42 shown in FIG. 2. FIGS. 4-8 show different perspectives and/or cross-section views of an exemplary embodiment of the AST 42. For example, FIG. 4 shows a front perspective of the AST 42, FIG. 5 shows a rear perspective of the AST 42, and FIG. 8 shows a top perspective of the AST 42. FIG. 6 shows a first side cross sectional view of the AST 42, and FIG. 7 shows a second side cross sectional view of the AST 42.

Referring to FIGS. 2 and 3, in operation, the engine 40 burns fuel to cause a rotation of the output shaft 56 of the engine 40. Output shaft 56 of the engine 40 may be operatively coupled to an input 106 of the AST 42, such as an input 106 of the AST 42. FIGS. 6, 7, and 8 show the input 106 of the AST 42. As best shown in FIG. 8, input 106 includes two shafts. For example, the first shaft of the input 106 is operatively coupled to a clutch 104 of the AST 42. The clutch 104 is then operatively coupled to the second input shaft. As explained below, the clutch 104 engages and/or disengages the two input shafts 106. For example, when the clutch 104 is engaged, the two input shafts are operatively coupled such that the output 56 drives (e.g., rotates) both input shafts 106, and the input shafts 106 rotate the output 120. When the clutch 104 is disengaged, the output 56 of engine 40 may rotate the first input shaft 106 (e.g., the shaft before the clutch 104), but does not rotate the second input shaft 106 (e.g., the shaft after the clutch 104).

In some examples, the input 106 may be a shaft that is operatively coupled to one or more shafts, and the one or more shafts may be coupled to the output 56 of the engine 40. For example, the output 56 of the engine may be operatively coupled to one or more additional shafts, such as shaft 92 (see FIG. 2). Another shaft may drive the input 106 when the clutch 104 is engaged. For example, another shaft may be an input shaft to the clutch 104, and when engaged, the input shaft to the clutch 104 drives the input 106 of the AST 42. In other examples, the shaft 56 of the engine 40 is the first input shaft 106 before the clutch 104.

Referring back to FIG. 3, the input 106 of the AST 42 is selectively operatively coupled to and/or drives a first gear set 122, 128. In some variations, the input 106 may include one or more gears and the first gear set 122, 128 may also include one or more gears. The gears of the input 106 and the gears from the first gear set 122, 128 are operatively coupled such that a rotation of one or more input gears causes a rotation of one or more gears from the first gear set 122, 128. The first gear set 122, 128 includes one or more shafts that are operatively coupled to the one or more gears and caused to rotate based on the rotation of the one or more gears.

FIGS. 7 and 8 show an example of the first gear set 122, 128. In the illustrated embodiment of FIGS. 7 and 8, the first gear set includes two gear sets, gear set B 128 and gear set C 122. Each gear set includes one or more gears and one or more shafts (e.g., shaft B and shaft C). The gears interact and/or are operatively coupled to the shaft of the gear set. The gears from the gear set B 128 are operatively coupled to the gears from the input 106. Additionally, and/or alternatively, the gears from the gear set B 128 are operatively coupled to one or more gears from gear set C 122. The rotation of the gears from the input 106 causes a rotation of the gears (and shaft B) of the gear set B 128, which further causes a rotation of the gears (and shaft C) of the gear set C 122. While FIG. 7 illustrates two gears sets for the first gear set 122, 128, there may be more and/or less gear sets, including more or less gears and/or gear shafts, within the first gear set 122, 128.

The first gear set 122, 128 includes multiple different gears with different gear ratios. For example, the rotation of the output 56 of the engine 40 may be within a consistent range of rotations per minute (RPM). However, an operator of the vehicle 10 may choose to speed up or slow down the vehicle 10. As such, while the rotation of the output 56 is constant, the vehicle 10 may switch between different gears, with different gear ratios, within the AST 42. Each gear ratio may cause the ground-engaging members 12, 14 of the vehicle 10 to slow down or speed up even when the output 46 of the engine 40 rotates at a substantially constant RPM.

As illustrated in FIGS. 3,7, and 8, the first gear set 122, 128 is operatively coupled to a first gear selector 124. The first gear selector 124 is positionable to select different gear ratios in response to a user input. A gear shift position may indicate a particular gear ratio for the vehicle 10. For example, the operator of the vehicle 10 may use a shifting component of the vehicle 10, such as a lever, handle, actuator, and/or other types of components, to shift to a different gear ratio. The first gear selector 124 uses the user indicated gear shift position to select a gear ratio.

In other words, once a gear shift position is selected, the AST 42 operatively couples the input 106 of the AST to the selected gears of the gear shift position. For example, in response to the user input, the first gear selector 124 moves (e.g., rotates and/or actuates) from a first position (e.g., first gear shift position) to a second position (e.g., second gear shift position). Depending on the new position, a new gear ratio from the first gear set 122, 128 is selected. In some variations, the first gear selector 124 is operatively connected to and/or includes a first gear selector interface. The first gear selector interface operatively couples to one or more gears from the first gear set 122, 128. The operation of selecting the gears is described in further detail below. In some examples, the first gear set 122, 128 includes a reverse gear set, a first forward gear set, a second forward gear set, a third forward gear set, a fourth forward gear set, and a fifth forward gear set. Further, the operator is able to provide user input to actuate the first gear selector 124 into six different gear positions and neutral, each position has a corresponding gear set from the first gear set 122, 128.

Referring back to FIG. 3, the first gear set 122, 128 is operatively coupled to a second gear set 118. Similar to the first gear set 122, 128, the second gear set 118 includes one or more shafts and one or more additional gears with additional gear ratios. Further, the second gear set 118 is operatively coupled to a second gear selector 112. Based on a user input, the second gear selector 112 is positionable to select a gear ratio from the second gear set 118.

FIGS. 6, 7, and 8 show an exemplary embodiment of the second gear set 118 with the second gear selector 112. Additionally, a component (e.g., actuator) 108 for rotating the second gear selector 112 is shown. As described above, a gear selector, such as the first or second gear selector 124, 112 rotates to different gear shift positions in response to a user input. An actuator, such as actuator 108, actuates or causes rotation of the gear selectors 124, 112. In some instances, two or more actuators are used to rotate the gear selectors 124, 112. For example, a first actuator 302 (shown in FIG. 23) is used to rotate the first gear selector 124 and a second actuator 108 is used to rotate the second gear selector 112. In other instances, a single actuator is used to rotate the gear selectors 124 and 112.

Referring back to FIG. 3, the second gear set 118 is operatively coupled to the output 120. The output 120 includes one or more gears and/or one or more shafts. For example, one or more gears from the second gear set 118 is operatively coupled to and/or drives one or more gears from the output shaft 120. In some examples, the output 120 is a shaft, such as an output shaft of the AST 42. Further, the output 120 is operatively coupled to one or more shafts, such as the front prop shaft 76 and/or the rear prop shaft 80. As mentioned above, the front/rear prop shafts 76, 80 are operatively coupled to the front and rear drive members 46, 48. FIGS. 6, 7, and 8 show the output 120, including the output shaft and gears. In other examples, the output 120 is operatively coupled to one or more shafts, and the one or more shafts is coupled to the front prop shaft 76 and/or the rear prop shaft 80.

Referring back to FIG. 3, a clutch 104 is operatively coupled to the input 106 of the AST 42. The clutch 104 is used to permit transition between different gear shift positions and/or gear sets of the AST 42. FIGS. 6, and 8 show an illustrative embodiment of the clutch 104 and the input 106 of the AST 42. As mentioned above, the AST 42 includes multiple different gear ratios (e.g., $1^{st}$ gear, $2^{nd}$ gear, reverse gear, etc.) and moves through multiple different gear shift positions, including gear shift positions for the first gear set 122, 128 and second gear set 118. The AST 42 moves through the gear ratio in a sequential order. After a change in gear shift position, the clutch 104 may disengage causing a disconnect between the input 106 and another shaft (e.g., shaft 56). For example, when the vehicle 10 is moving, a control system may close the clutch 104 to permit the output 56 of the engine 40 to drive the output 120 of the AST 42. After receiving a user input indicating a change in the gear shift position, the clutch 104 may disengage or open, causing a disconnect between the output 56 of the engine 40 and the output 120 of the AST 42.

Referring to FIGS. 6 and 8, a hydraulic control unit (HCU) 102 is shown. The HCU 102 is configured to provide hydraulic fluids (e.g., oil) to the AST 42. For example, the AST 42 requires lubrication to operate smoothly, and the HCU 102 provides lubrication to the different components of the AST 42, such as the clutch 104, the input 106, and/or the gears from the first and second gear sets 122, 128, 118. As shown in FIG. 6, the HCU 102 is positioned in the AST 42 such that at least a portion of the HCU 102 is above the gear sets 122, 128, 118, the clutch 104, the input 106, and/or the output 120. The positioning and operation of the HCU 102 is described in further detail below.

Concentric Shift Drum

Figure 13:
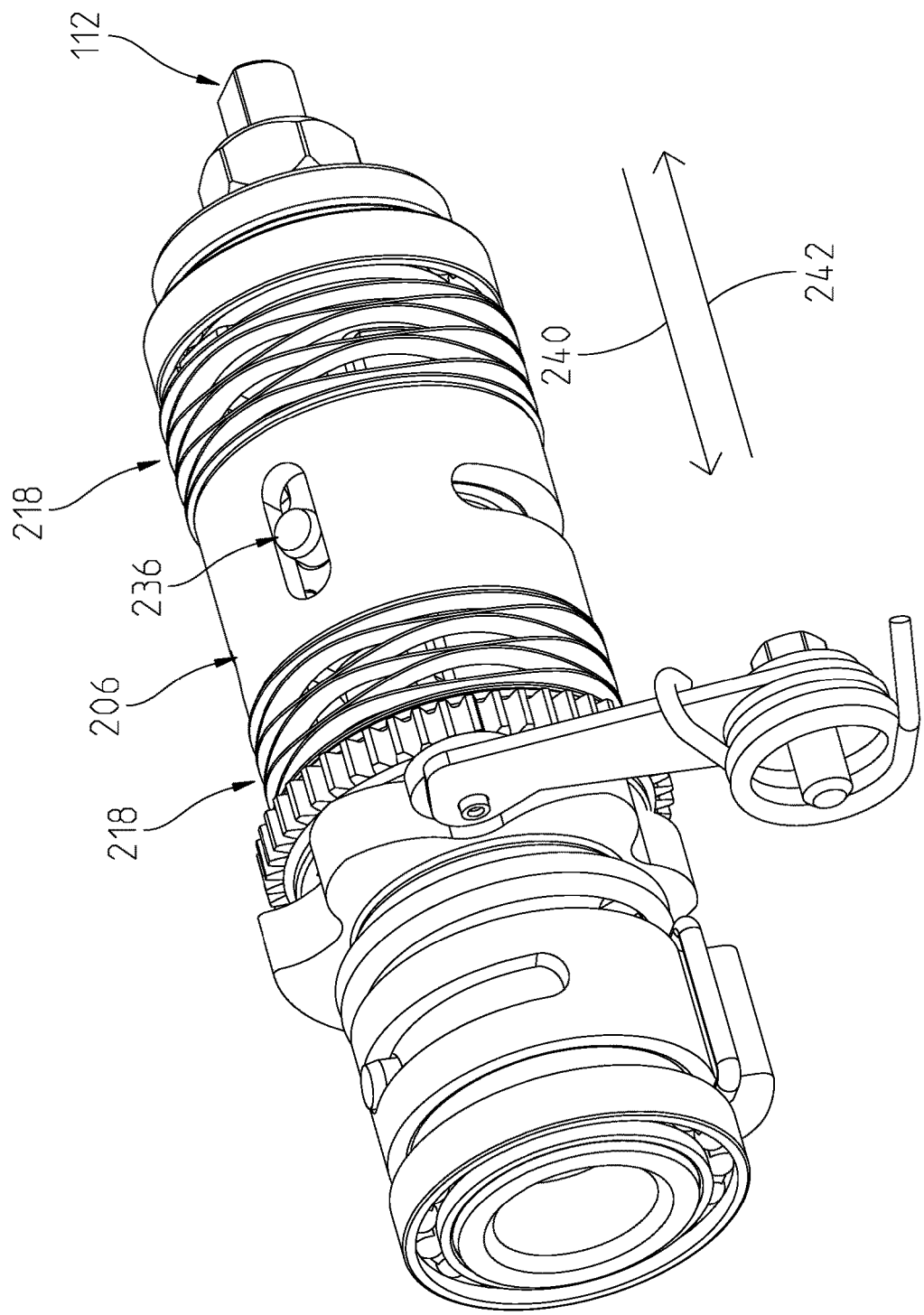
FIG. 13 shows a rear perspective of the second gear selector of FIG. 9.
Figure 14:
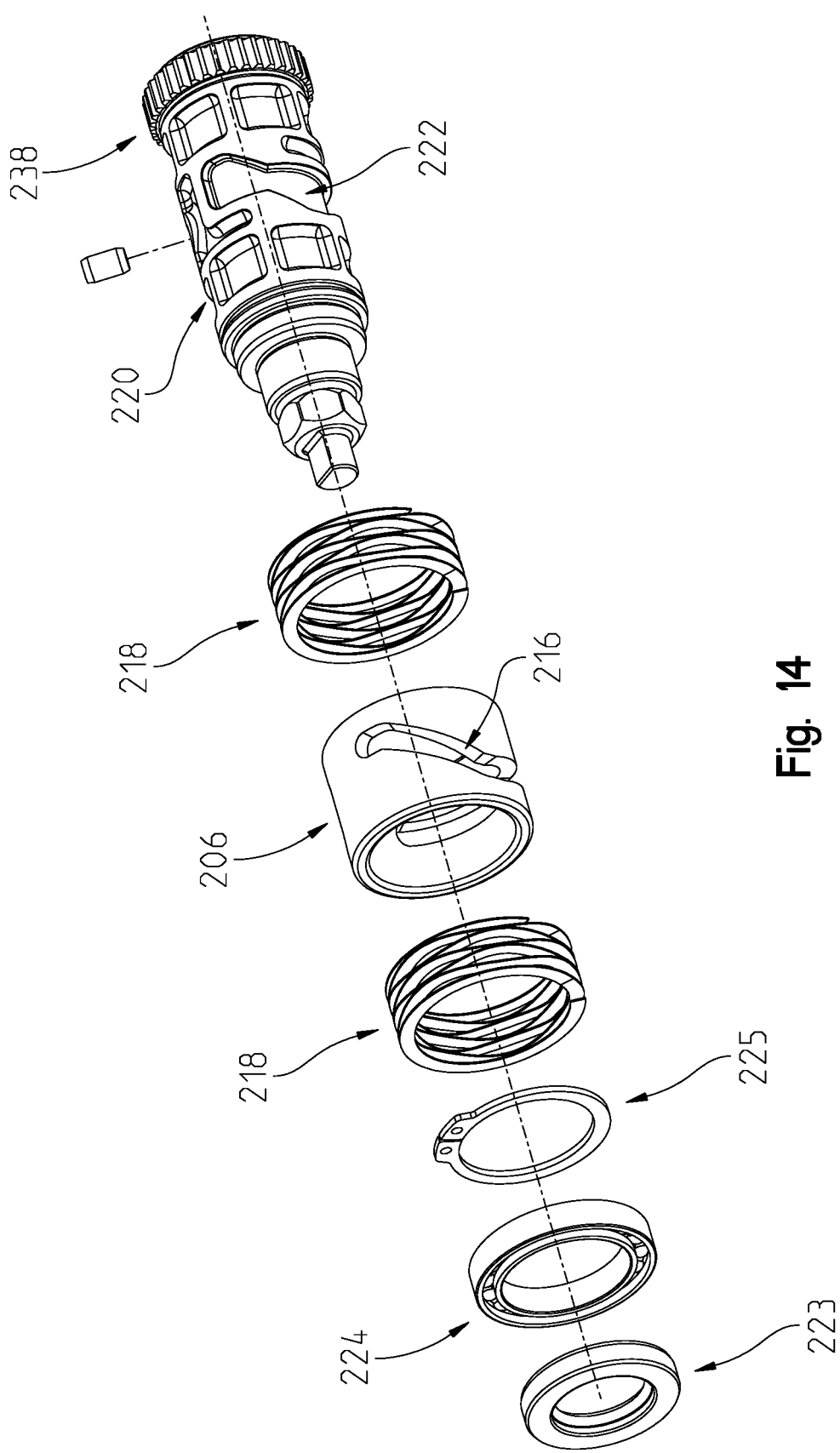
FIG. 14 shows an exploded view of the components of the second gear selector of FIG. 9.
Figure 15:
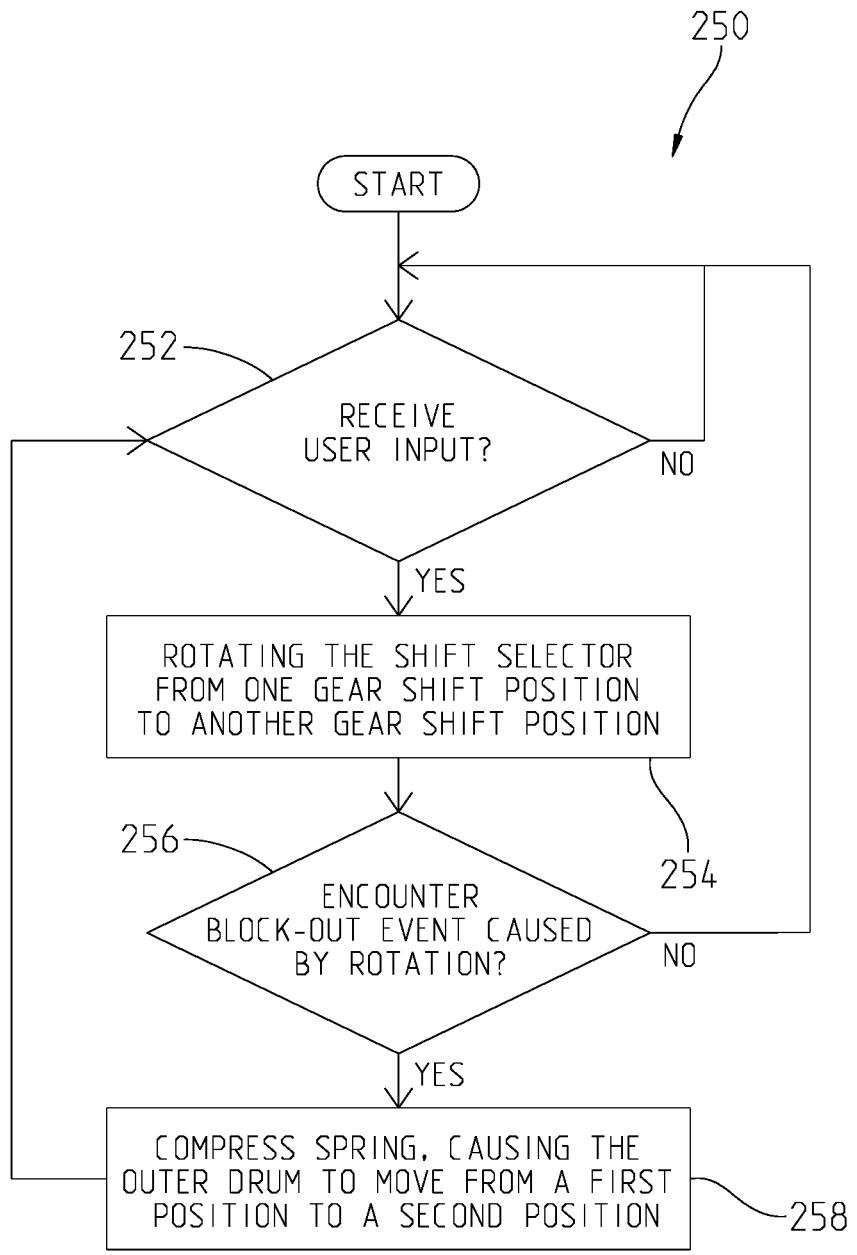
FIG. 15 is an exemplary flowchart for operating the second gear selector when encountering block-out events.

FIGS. 9-14 show an illustrative embodiment of a portion of the AST 42, including the second gear selector 112 and the second gear set 118. In particular, among other components, FIGS. 9-14 show components of the second gear selector 112. FIG. 15 shows an exemplary flowchart describing the operation of transitioning from a first gear shift position to a second gear shift position for the second gear selector 112. FIGS. 16-22 show components of the second gear selector 112 and a shift fork 210 through different gear positions.

Figure 9:
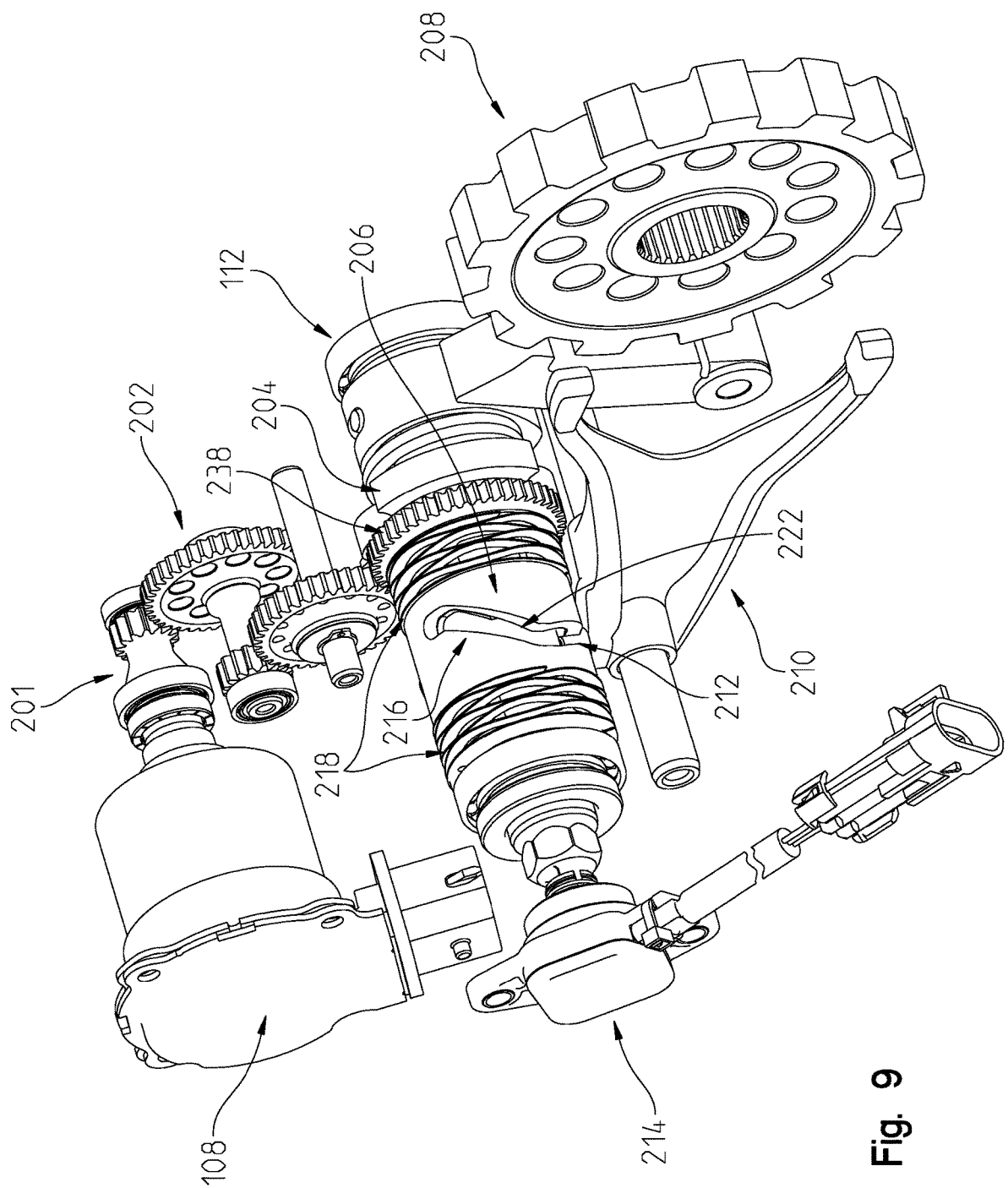
FIG. 9 shows an illustrative embodiment of a portion of the AST, including a second gear selector and a second gear set.

Referring to FIG. 9, an exemplary actuator 108 for rotating the second gear set 118 is shown. Actuator 108 may receive user input (e.g., mechanical, electrical, hydraulic, pneumatic) for positioning the second gear set 118. In the illustrative embodiment of FIG. 9, the actuator 108 includes at least one gear 201 positioned towards an end of the actuator 108. The actuator 108 converts the received user input into a mechanical movement.

The actuator 108 is operatively coupled to one or more gears 202. In some instances, such as the illustrative embodiment of FIG. 9, the one or more gears 202 may operate as a clockwork reduction, such as a 2-stage clockwork reduction. The gear at the end of the actuator 108 drives the one or more gears 202. The gears 202 are operatively coupled to gear 238 of the second gear selector 112. The gears 202 drive the gear 238 of the second gear selector 112. In other words, in response to user input, the actuator 108 moves (e.g., rotates) the gears between it and the second gear selector 112, such as the gears 202, the gear at the end of the actuator 108, and the gear 238. In some instances, the AST 42 may include more or less than the five gears between the actuator 108 and the second gear selector 112. For instance, the AST 42 might not include the gears 202, and the gear at the end of the actuator 108 may be directly coupled to the gear 238 of the second gear selector 112. In another instance, the AST 42 might not include any gears, and the actuator 108 may provide a signal (e.g., electric signal) to the second gear selector 112 to cause a rotation of the second gear selector 112.

The second gear selector 112 includes multiple different components, including the gear 238. Many of the components of the second gear selector 112 are best shown in FIG. 14. Referring to FIG. 14, the second gear selector 112 includes a seal 223, a bearing 224, a snap ring 225, one or more springs 218, a first actuator 206 (e.g., an outer drum, shell, and/or casing), a second actuator 220 (e.g., an inner drum), and the gear 238. The second actuator 220 includes an indented portion 222. The indented portion 222 (e.g., an inner track) is shaped to include multiple different gear shift positions. The first actuator 206 also includes a hollow, open, or carved out portion 216 (e.g., outer track). As explained herein, the inner track 222 and the outer track 216 cooperate to select the gear of the second gear set.

Figure 10:
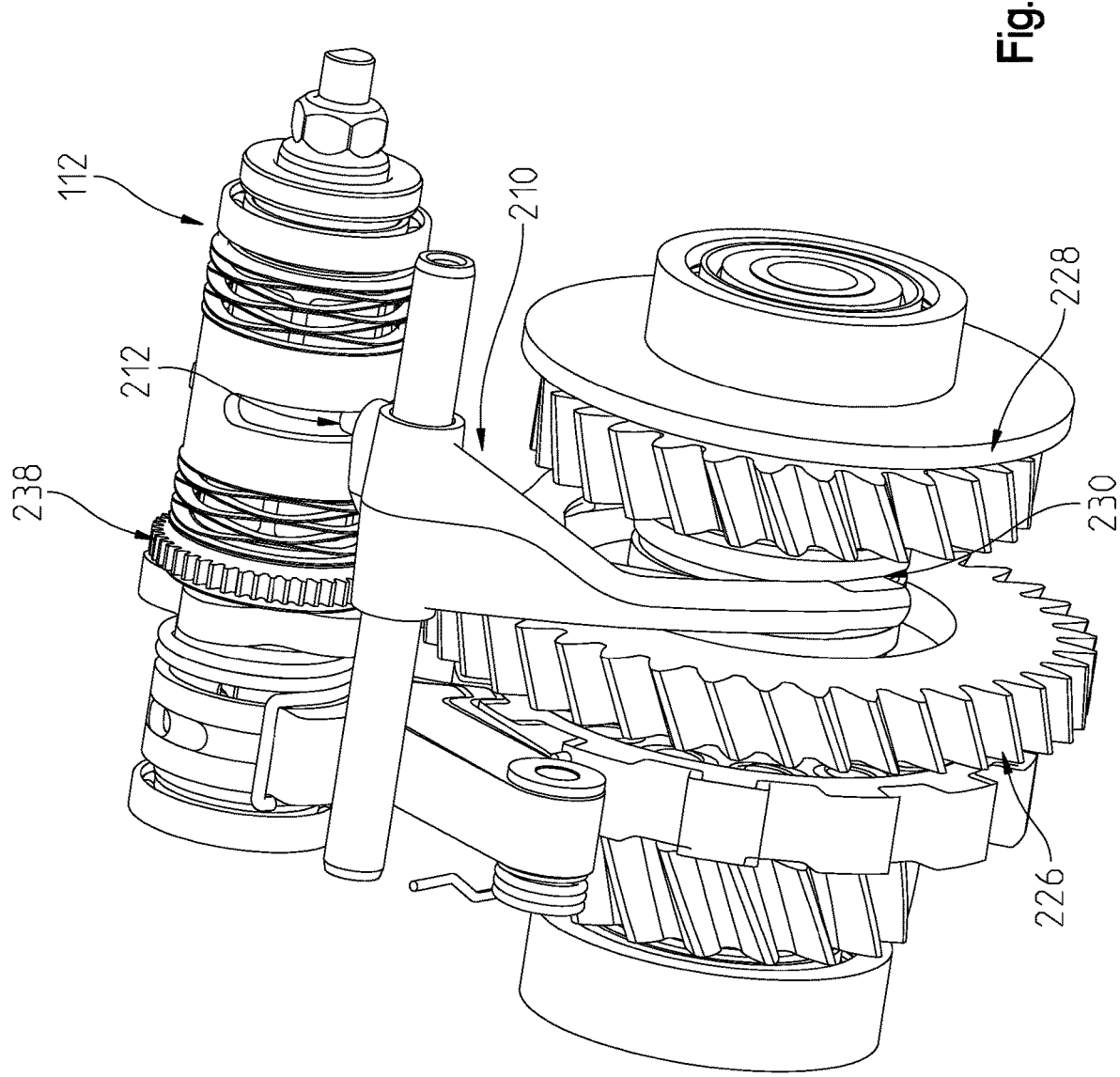
FIG. 10 shows the second gear selector of FIG. 9, a shift fork, and a plurality of gears operatively coupled to the second gear selector.

As best shown in FIGS. 9 and 10, when assembled, the first actuator 206, such as the outer drum, encases and/or encompasses the second actuator 220. In other words, the second gear selector 112 is assembled such that the first actuator 206 is a sleeve into which as least a portion of the second actuator 220 is received. Further, when assembled, outer track 216 is positioned directly over at least a section of the inner track 222. As such, a pin 212 of a shifting member 210 extends through the opening created by the outer track 216. In some instances, the pin 212 of the shifting member 210 is operatively coupled to the inner track 222. In other instances, the pin 212 does not directly connect or touch the inner track 222.

The pin 212 of the shifting member 210 extending through the opening of the outer track 216 is best shown in FIGS. 9 and 10. In operation, the actuator 108 actuates the gear 238 of the second gear selector 112. The gear 238 is operatively coupled to the second gear selector 112 such that a rotation of the gear 238 rotates the second gear selector 112. For example, as best shown in FIG. 14, the gear 238 is operatively coupled (e.g., directly attached) to the inner drum 220. A rotation of the gear 238 causes a rotation of the inner drum 220. As best shown in FIG. 13, a protrusion 236 is operatively coupled to the inner drum 220 and protrudes or extends through an opening of the outer drum 206. The protrusion 236 locks the inner drum 220 to the outer drum 206 such that a rotation of the inner drum 220 causes a rotation of the outer drum 206.

Figure 11:
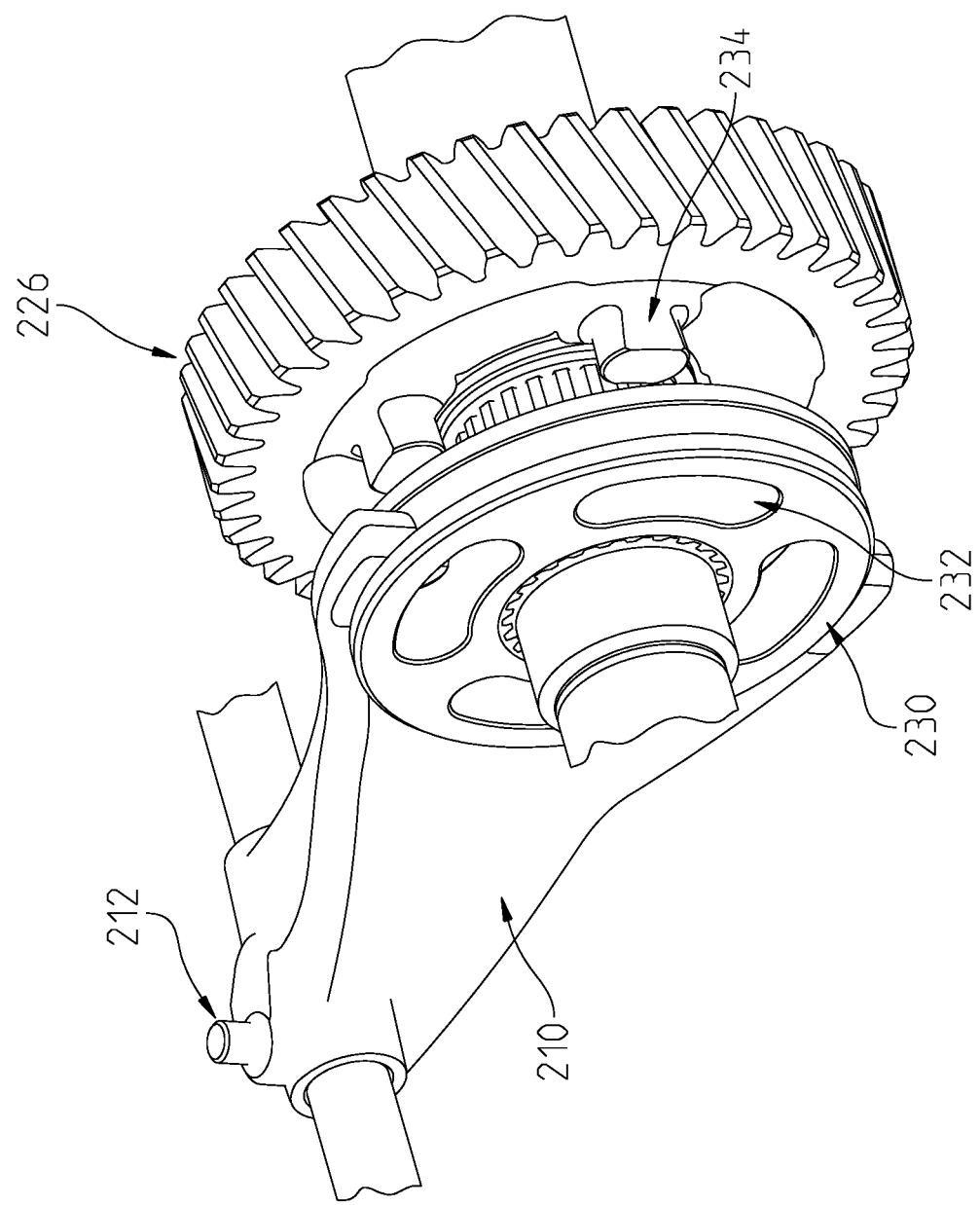
FIG. 11 shows another perspective of the shift fork from FIG. 10.

As best shown in FIGS. 10 and 11, a shiftable member 210 (e.g., a shift fork) is operatively coupled to and/or includes an interface 230. The interface 230 is operatively coupled to a first gear 226 and/or a second gear 228. The first gear 226 when selected results in a different gear ratio than when the second gear 228 is selected. As mentioned above, the second shift selector 112 and/or the first shift selector 124 may include multiple different gears resulting in multiple different gear ratios. Depending on which gear ratio is engaged in the AST 42, the output 120 of the AST 42 may have a different RPM than the input 106 of the AST 42.

Figure 12:
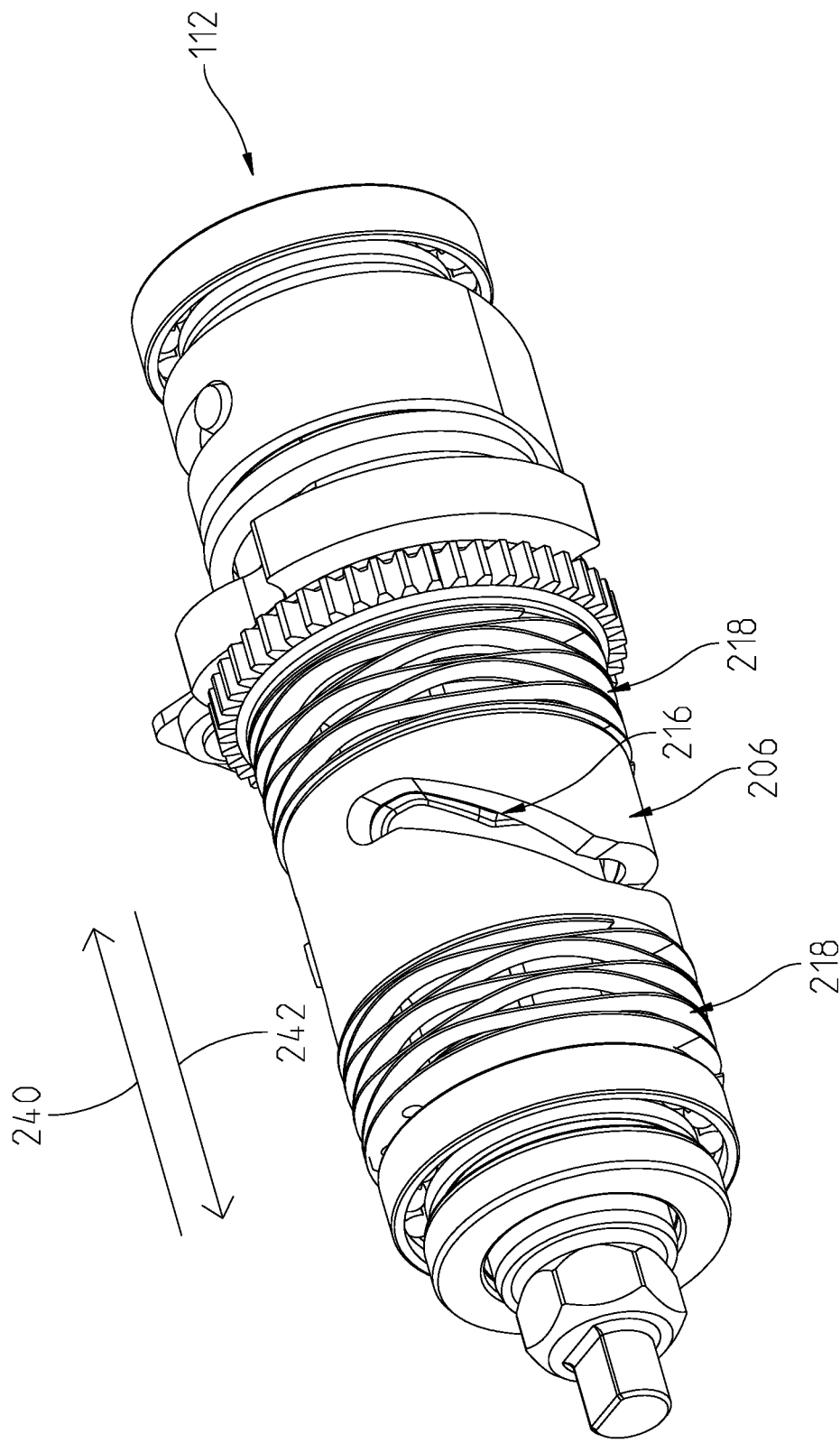
FIG. 12 shows a front perspective of the second gear selector of FIG. 9.

In some instances, neither gear 226 nor gear 228 is engaged by the gear shift selector 210. Then, in response to user input and the rotation of the second shift selector 112, the shiftable member 210 moves longitudinally (e.g., left or right) based on the outer drum 206 and/or the inner drum 220. For example, as best shown in FIGS. 9 and 12 and will be described in further detail below relating to FIG. 15, the outer track 216 and/or the inner track 222 are not completely linear. Instead, the outer track 216 of the outer drum 206 and/or the inner track of the inner drum 220 has straight sections and curved sections. When the rotation of the second shift selector 112 causes the pin 212 of the shiftable member 210 to travel through a curved section of the outer drum 206 and/or the inner drum 220, the outer drum 206 and/or the inner drum 220 guides the shiftable member 210 from a first position (e.g., a left, center, or right position) to a second position (e.g., a left position, center, or right position). In other words, referring to FIG. 9, the sides of the outer drum 206 directs or guides a movement of the pin 212 horizontally (e.g., left or right), causing the shiftable member 210 to move to a different position.

Referring to FIG. 10, movement of the shiftable member 210 from the first position to the second position causes the interface 230 of the shiftable member 210 to engage with the gears (e.g., a first gear 226 or a second gear 228) of the second gear set 118. Additionally, and/or alternatively, the movement may cause the shiftable member 210 to transition from an engagement with the first or second gear 226, 228 to an engagement with the other of the first or second gear 226, 228. Referring to FIG. 11, an exemplary embodiment of the interface 230, the shiftable member 210, and the gear 226 is shown. In the illustrative embodiment, the shiftable member 210 is a shift fork and the shift fork includes the pin 212 that operatively couples to the inner/outer drum 206, 220. The interface 230 is a dog ring that is operatively coupled to the shift fork 210. Further, the dog ring 230 includes one or more openings 232 (e.g., dog pockets or mating pockets). The gear 228 includes one or more protrusions 234 (e.g., dogs, pegs, shift pegs, splines) (see also dogs 34 of gear 226 in FIG. 11). When the shiftable member 210 moves toward the gear 228 to engage with the gear 228, the openings 232 of the interface 230 line up with the protrusions 234 of the gear 228. After the protrusions 234 line up and engage the openings 232, the gear 228 is engaged. In some variations, such as shown in FIG. 11, the openings 232 are larger than the protrusions 234 causing an easier and/or more reliable engagement of the openings 232 and the protrusions 234. In some instances, there are more or less than the four openings 232 and/or protrusions 234 shown for the gear 226 and/or interface 230.

In some examples, a block-out event is caused by a misalignment between the openings 232 and the protrusions 234. For example, when the shiftable member 210 attempts to engage the gear 228, the openings 232 might not align with the protrusions 234. As such, a block-out event occurs since due to the misalignment, the shiftable member 210 is not able to move from a first position (e.g., a position where the gear 228 is not engaged) to the second position (e.g., a position where the gear 228 is engaged). In other words, the shiftable member 210 remains stationary and/or substantially stationary in the first position. In such examples and referring back to FIG. 9, the rotation of the second shift selector 112 causes the portion 212 to be in a curved portion of the outer track 216. However, since the shiftable member 210 is unable to be moved to the second position due to the block-out event, the outer track 216 may move instead. In other words, at least one spring 218 (e.g., a biasing member) compresses and/or at least another spring 218 expands causing the outer track 216 to move from a first position (e.g., from a center position) to a second position (e.g., a left or right position). This movement is explained in further detail below.

In some examples, only one spring 218 is used to move the outer track 216 form the first position to the second position. In other examples, more than two springs 218 are used to move the outer track 216. In yet other examples, an actuator 218 (e.g., a mechanical, electrical, or hydraulic actuator) is used to move the outer track 216 from the first position to the second position without assistance of a spring compressing or extending.

As mentioned above, a gear shift position may indicate a particular gear ratio for the vehicle 10. In other words, depending on the gear shift position, one or more gear ratios are selected to change the rotational speed of the output 120 versus input 106 of the AST 42. Additionally, and/or alternatively, some gear shift positions may cause the vehicle to park (e.g., the output 120 is prevented from substantially moving/rotating), reverse (e.g., the output 120 rotates in a reverse direction), and/or neutral (the output 120 is able to move without being operatively connected to the input 106 being driven by the engine 40).

Referring to FIG. 9, the actuator 108 rotates the second gear shift selector 112 into different gear shift positions. In the illustrative embodiment of FIGS. 9-14, the second gear shift selector 112 includes a park gear position (e.g., for the park gear 208), a neutral gear position, a high gear position (e.g., engaging a high gear ratio gear 228), and a low gear position (e.g., engaging a low gear ratio gear 226). However, in some variations, the second gear shift selector 112 includes additional gears and/or gear ratios/functions, such as a reverse, first gear, second gear, and so on.

The actuator 108 uses a mechanical arrangement 204 (e.g., a detent, such as a detent star) to assist in rotating the second gear shift selector 112 into different gear shift positions. For example, in the illustrative embodiment of FIG. 9, the mechanical arrangement 204 is a detent star with four grooves. Each groove relates to one of the gear shift positions of the shift selector 112. In operation, the detent star 204 prevents over-rotation of the shift selector 112. For example, if the user seeks to move from a first gear shift position to a second gear shift position, the detent star 204 prevents the shift selector 112 from over-rotating into the third gear shift position.

FIG. 9 also shows a second gear shift selector sensor 214. The sensor 214 is configured to detect the gear shift position of the second selector 112. Further, the sensor 214 is configured to provide information (e.g., the gear shift position) to a controller, such as an engine control module (ECM), display on the vehicle 10, and/or other entities of the vehicle 10.

FIG. 15 shows an exemplary flowchart describing a method 250 for actuating the second gear shift selector 112 when encountering a block-out event. FIGS. 16-22, which will be described with FIG. 15, shows the inner drum track 222, the outer drum track 216, and the portion 212 of the shiftable member 212 through the multiple different gear shift positions described above.

In operation, at step 252, the AST 42 (e.g., the actuator 108) determines whether it has received user input indicating a change in the gear shift position. Actuator 108 includes a controller which controls operation of the actuator 108 or a remote controller which controls operation of the actuator 108. If not, the actuator 108 may wait until it has received user input. If the actuator 108 receives the user input, the method 250 moves to step 254.

Figure 16:
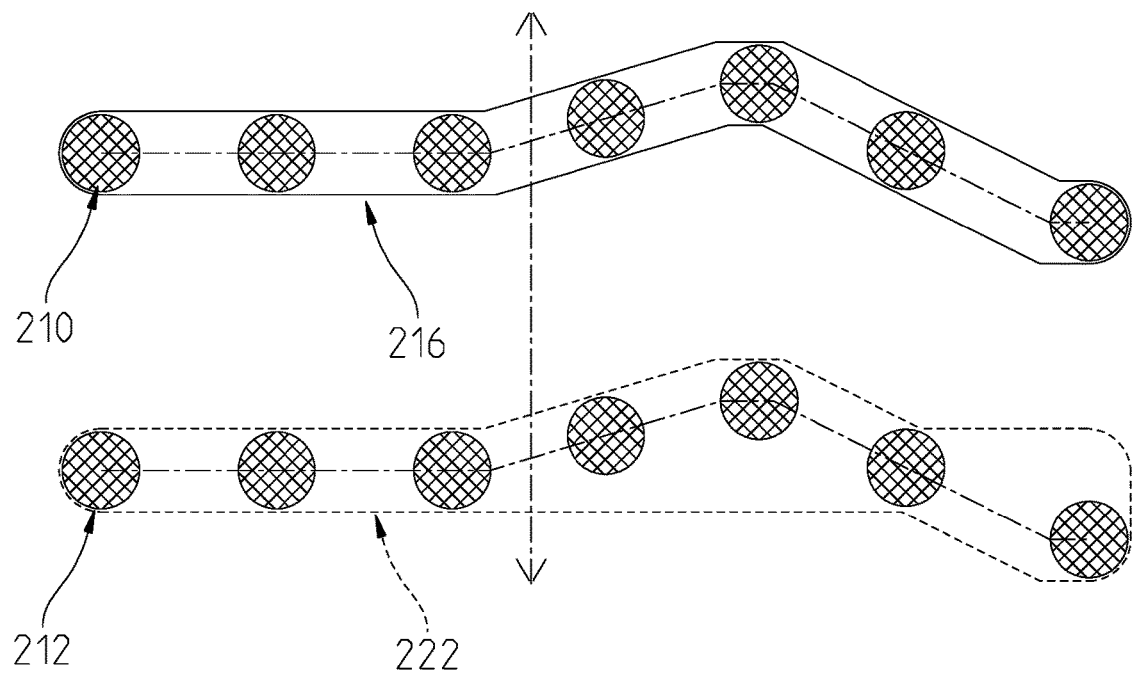
FIGS. 16-22 shows components of the second gear selector, including an inner drum track, an outer drum track, and a shiftable member, moving through multiple different gear shift positions.
Figure 17:
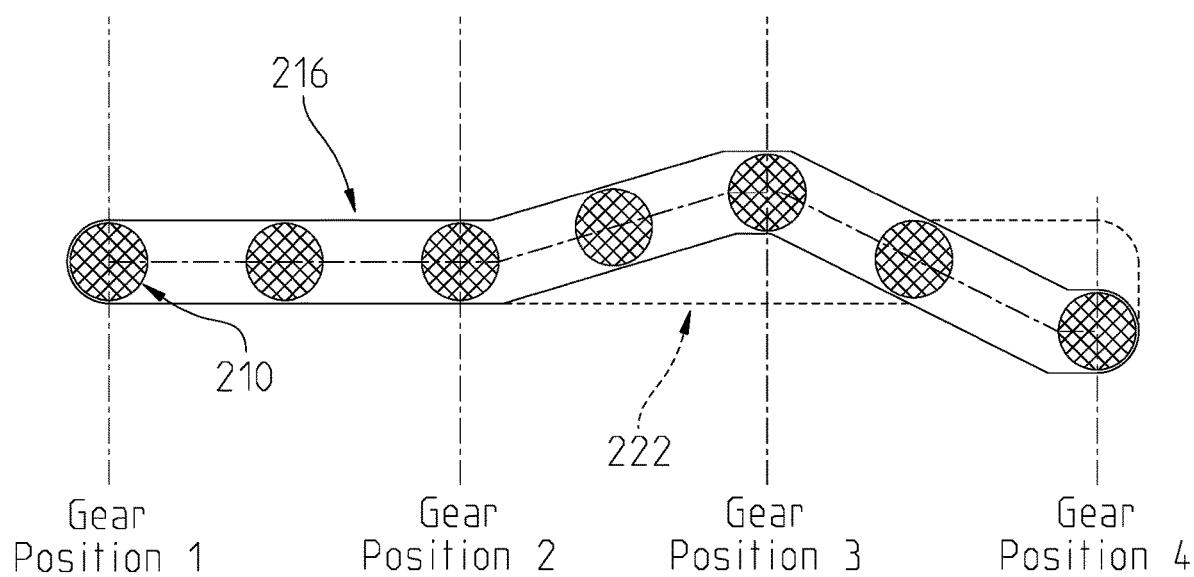

At step 254, the AST 42 rotates the shift selector 112 from a first gear shift position to a second gear shift position. For example, referring to FIG. 9, the actuator 108 drives the gear 238 of the second gear shift selector 112. The gear shift selector 112 includes four gear shift positions, park, neutral, high gear, low gear. Referring to FIGS. 16 and 17, the first position is a park gear shift position, the second position is a neutral gear shift position, the third position is a high gear shift position, and the fourth position is a low gear shift position. Each rotation of the gear shift selector 112 causes a different gear set to be engaged or not gear set to be engaged in the case of the neutral gear shift position. For example, referring back to FIG. 9, in the first position, the gear shift selector 112 causes the parking gear 208 to be engaged.

Further, as best shown in FIGS. 10 and 11, in the third and fourth positions, the gear shift selector 112 causes the gears 226 and 228, respectively, to be engaged. As mentioned previously, the gear shift selector 112 engages the gears 226 and 228 using the shiftable member 210 and the interface 230. In other words, the shiftable member 210 moves from a first position to a second position such that the holes 232 of the interface 230 engage with the protrusions 234 of the gears, such as gear 228. The inner track 222 and/or the outer track 216 guide the movement of the shiftable member 210 to different positions. Referring to FIG. 16, the tracks 216 and 222 are shown with the portion 212 of the shiftable member 210. As shown the outer track 216 guides (e.g., moves) the portion 212 up and/or down depending on the position. FIG. 17 shows the overlap of the tracks 216 and 222 when the gear shift selector 112 is assembled. Further, FIG. 17 shows the different positions (e.g., gear shift positions) for the gear shift selector 112.

Referring to FIG. 15, at step 256, the AST 42 determines whether it has encountered a block-out event caused by the rotation of the gear shift selector 112. As mentioned previously and referring to FIG. 11, the block-out event may occur due to a misalignment between the holes 232 of the interface 230 and the protrusions 234 of the gear 226. Similarly, in some examples, a block-out event also occurs due to a misalignment between the holes 232 of the interface 230 and the protrusions of the other gear 226.

If the AST 42 does not encounter a block-out event, the method 250 moves back to step 252 and repeats. FIG. 17 shows an example implementation of the components of the gear selector 112 when the AST 42 does not encounter block-events. For example, the user may shift the vehicle 10 into multiple different gear shift positions. For example, initially, the vehicle 10 is in position 1 (e.g., a park gear shift position). The user provides input to shift from the park position to position 2 (e.g., neutral gear shift position). The tracks 216 and 222 are substantially linear between the first and second positions. As such, during a shift from the first gear shift position to the second gear shift position, the tracks 216 and/or 222 do not guide or move the shiftable member 210.

The user may shift the vehicle 10 from the neutral gear shift position (e.g., position 2) to position 3 (e.g., a high gear shift position). The tracks 216 and 222 are not linear and are designed such that they guide the shiftable member 210 to engage with a gear corresponding to position 3. For example, referring to FIG. 10, the gear 228 is for the high gear shift position. Referring back to FIG. 17, in position 3, the tracks 216 and/or 222 guide or moves the shiftable member 210 from a first position to a second position such that the interface 230 of the shiftable member 210 engages with the protrusions of the gear 226 causing the input 106 to drive a rotation of the gear 226.

The user may shift the vehicle 10 from the high gear shift position (e.g., position 3) to position 4 (e.g., a low gear shift position). Similar to above, the tracks 216 and/or 222 guides or moves the shiftable member 210 from the second position to a third position. In other words, the tracks 216 and/or 222 guide the shiftable member 210 such that the interface 230 engages with the protrusions of the gear 228 causing the input 106 to drive a rotation of the gear 228.

Referring back to step 256, if the AST 42 encounters one or more block-out events, the method 250 moves to step 258. At step 258, the block-out event causes a compression of one or more springs 218, causing the outer drum 206 to move in a horizontal direction. Referring to FIGS. 12 and 13, when a block-out event occurs, the springs 218 compress and/or extend such that the outer drum 206 moves either in a first direction 240 or a second direction 242. In other words, during a block-out event, the outer drum 206 slides axially on the inner drum 220 such that the shiftable member 210 remains in the center of the inner drum track 222. The outer drum 206 moves in the first or second directions 240, 242 depend on which gear 226 or 228 is causing the block-out event. If a block-out event does not occur, the springs 218 might not compress.

In other words, the user may seek to shift from the park or neutral gear positions (e.g., position 1 or 2) to the low gear position (position 4). However, due to the block-out event caused by a middle gear shift position (e.g., position 3), the gear shift from position 1 or 2 to 4 may fail. As such, the springs 218 may be used to move the outer drum 206 and/or the outer drum track 216 such that the AST 42 switches gear shifts even when a block-out event occurs. Further, at least a portion of the inner track 222 is expanded or increases compared to the outer track 216. As best shown in FIGS. 16 and 17, the inner drum track 222 is expanded in the third and fourth gear positions compared to the outer drum track 216. This expansion permits the outer drum track 216 to move in direction 240 and/or 242 and still remain within the inner drum track 222. When the block-out and/or the misalignment, is resolved the compressed spring 218 causes the outer drum to recenter relative to the inner drum and for the previously blocked out gear to be engaged.

Figure 18:
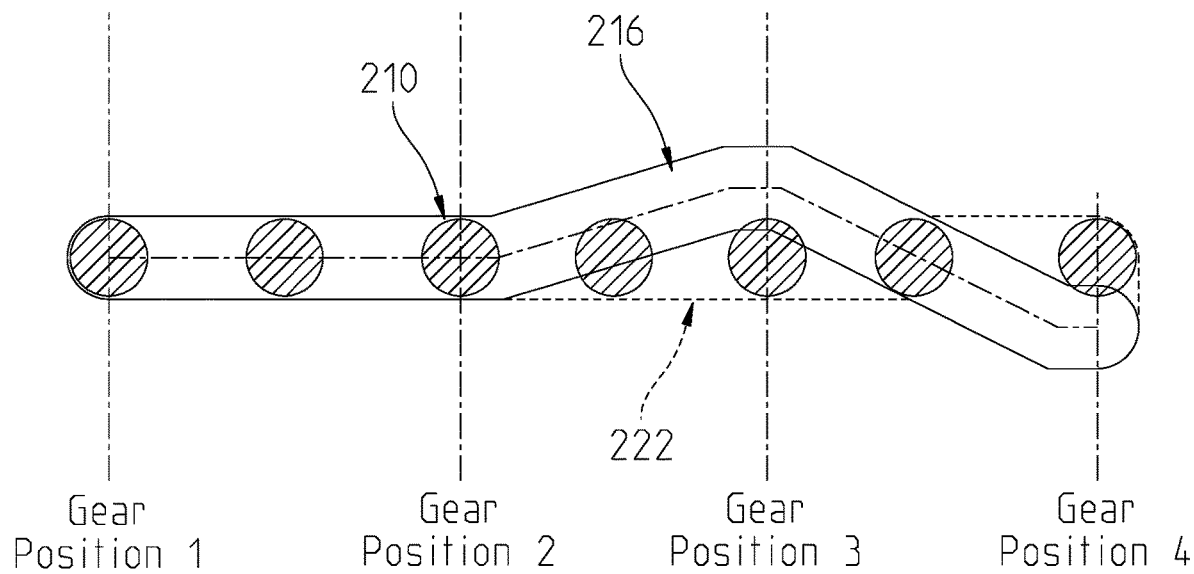
Figure 19:
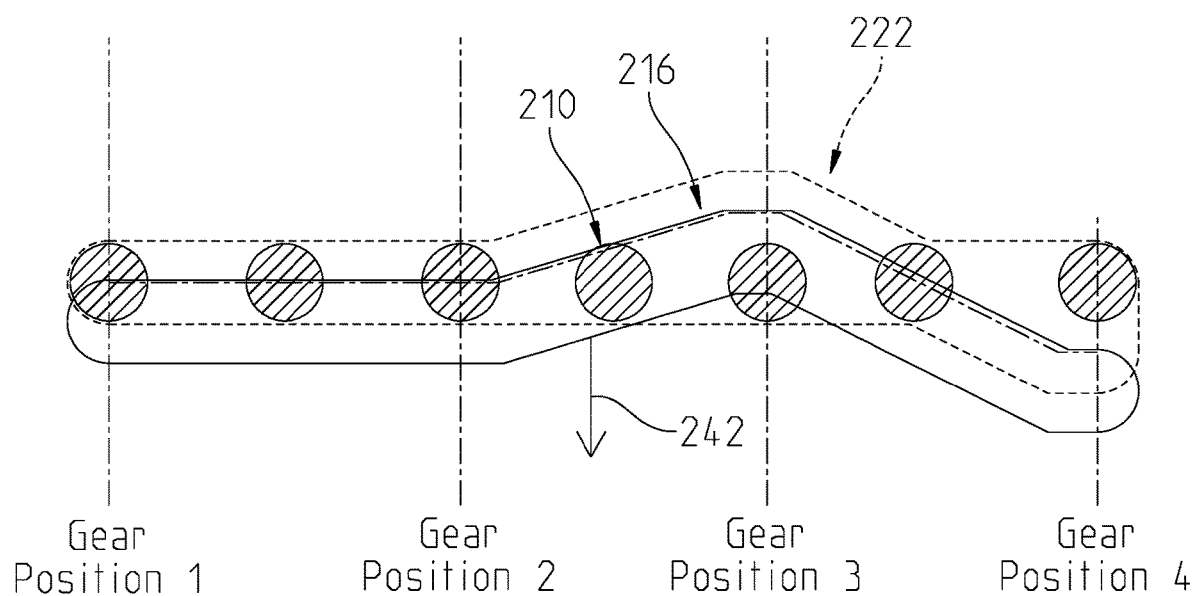
Figure 20:
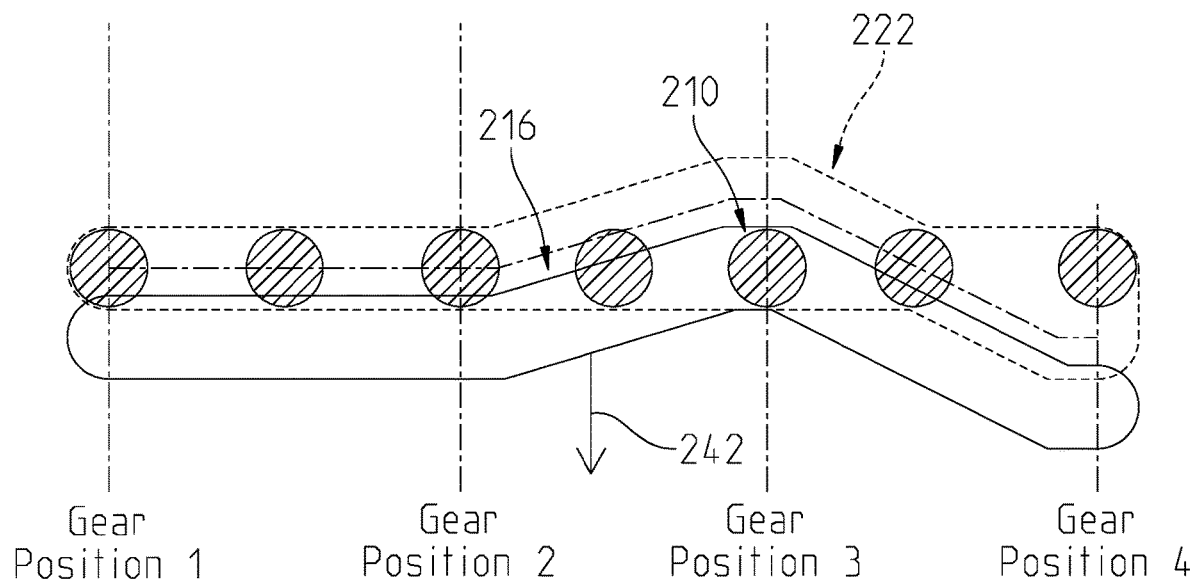

FIGS. 18-22 show an example implementation of the components of the gear selector 112 when the AST 42 encounters block-events. For example, FIG. 18 shows the position of the shiftable member 210 is at position 2 (e.g., the neutral gear shift position). When a block-out event occurs, the shiftable member 210 is stationary and unable to move. Instead, the outer drum 206 moves in direction 240 or 242. FIGS. 19-22 show the movement of the outer drum 206, including the outer drum track 216. FIGS. 19 and 20 show the movement of the outer drum 206 and the outer drum track 216 when the user shifts the AST 42 from position 2 to position 3. In other words, when the user shifts from neutral to a high gear shift position, a block-out event may occur preventing the shiftable member 210 from moving. In such events, the springs 218 may compress and/or extend such that the outer drum 206 and the outer drum track 216 moves in a first direction 242. In other words, the outer drum 206 slides on the inner drum 220 in the first direction 242. As shown in FIG. 20, at position 3, the outer drum track 216 moves in the first direction 242 from the original position to a new position. Additionally, and/or alternatively, the inner drum track 222 at position 3 is expanded when compared to the outer drum track 216 at position 3. This expansion allows the outer drum track 216 to slide within the inner drum track 222 during block-out events.

Figure 21:
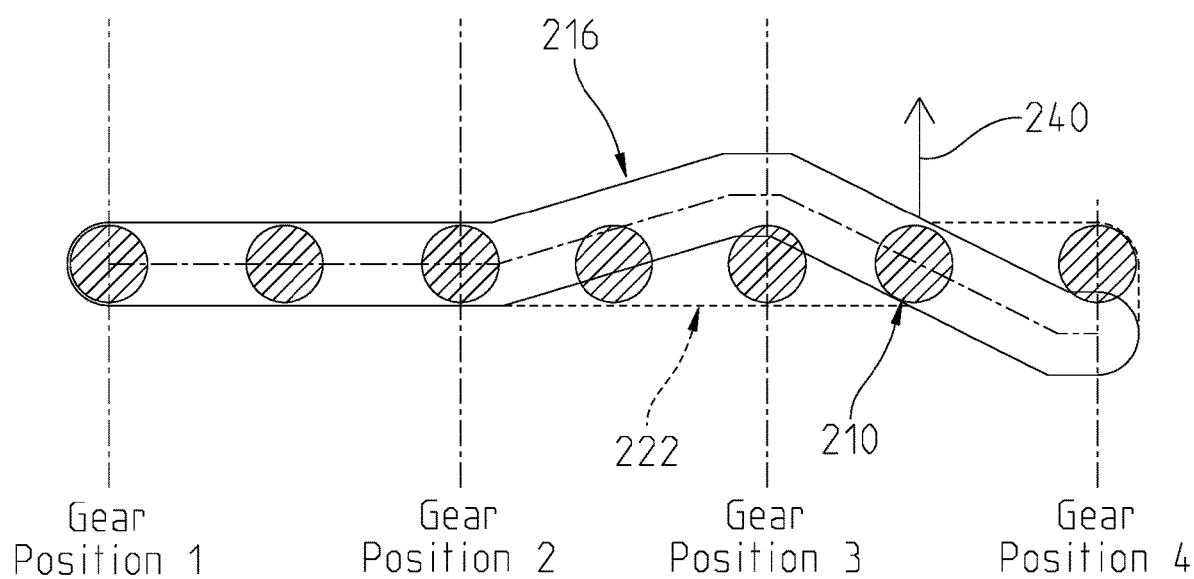
Figure 22:
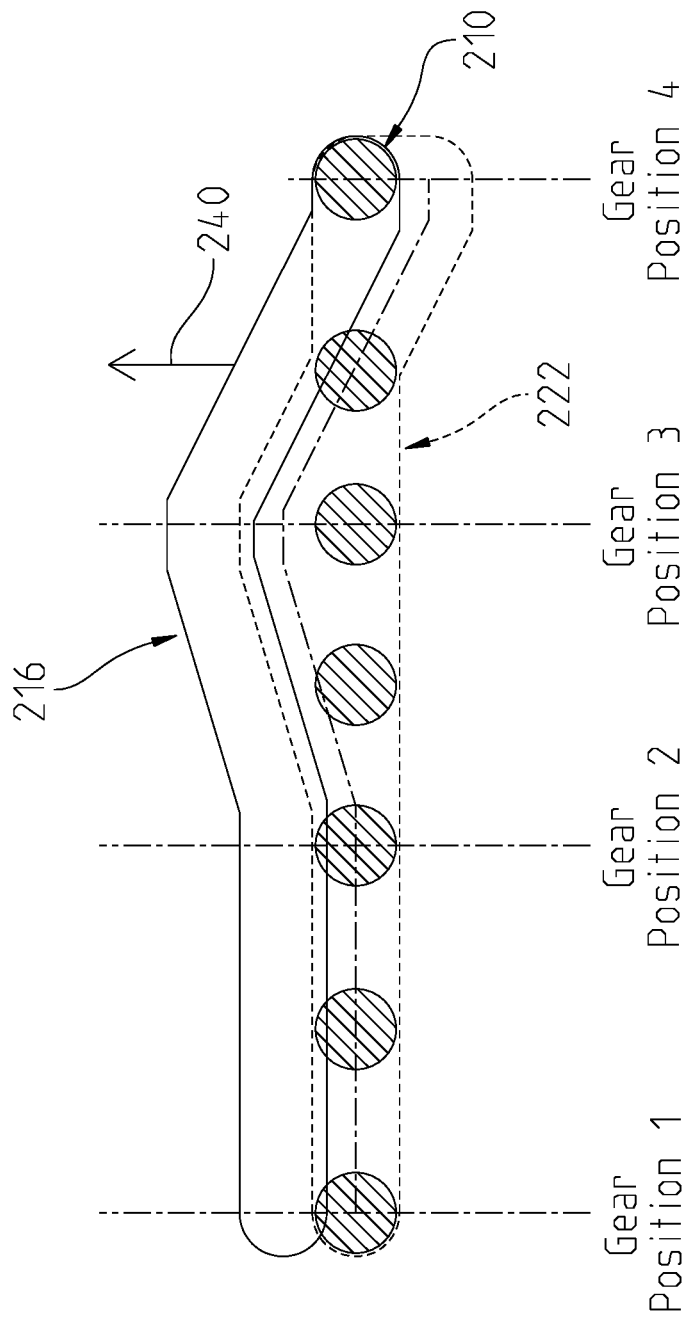

FIGS. 21 and 22 show the movement of the outer drum 206 and the outer drum track 216 when the user shifts the AST 42 from position 3 to position 4. In other words, when the user shifts from the high gear shift position to a low gear shift position, a block-out event may occur preventing the shiftable member 210 from moving. In such events, the springs 218 may compress and/or extend such that the outer drum 206 and the outer drum track 216 moves in a second direction 240. In other words, the outer drum 206 slides on the inner drum 220 in the second direction 240. As shown in FIG. 22, at position 4, the outer drum track 216 moves in the first direction 240 from the first position to the second position. Additionally, and/or alternatively, the inner drum track 222 at position 4 is expanded when compared to the outer drum track 216 at position 4. This expansion allows the outer drum track 216 to slide within the inner drum track 222 during block-out events.

In some examples, when the block-out event ends (e.g., when protrusions 234 of the gear 226 align with the holes 232 of the interface 230 and the shiftable member 210 engages with the gear 226), the springs 218 may decompress, causing the outer drum track 222 to normalize as shown in FIG. 17.

In some variations, the method 250 and the components of the second gear selector 112 permitting the outer drum 206 to slide axially on the inner drum 220 is used on other gear ratios, sets, or types. For example, the first gear selector 124 may include similar components of the second gear selector 112 such that during a block-out event, the first gear selector 124 may axially slide an outer drum over the inner drum and/or portions of the inner drum are expanded compared to the outer drum.

Hydraulic Control Unit

Referring to FIGS. 6 and 8, the HCU 102 is shown. For example, as shown in FIG. 6, at least a portion of the HCU 102 is positioned above at least a portion of the clutch 104 and/or other components of the AST 42. In other words, FIG. 6 shows an example orientation of the AST 42 in a vehicle, such as vehicle 10. In the AST 42, the HCU 102 is positioned above (e.g., higher off the ground of the vehicle 10) at least the clutch 104. Additionally, and/or alternatively, the HCU 102 is positioned above other gears sets and/or other components of the AST 42. FIG. 8 shows a top perspective of the AST 42. As shown, at least a portion of the HCU 102 is positioned directly above at least a portion of the clutch 104. Additionally, and/or alternatively, at least a portion of the HCU 102 is positioned above the input 106 and/or one or more gears, such as the first gear set 122 or 128.

An advantage among others of mounting the HCU 102 above other components of the AST 42 is it causes the AST 42 to sit lower (e.g., closer to ground) in the chassis of the vehicle 10. Another advantage among others is this location may lower the center of gravity of the vehicle 10 and/or allows for better ground clearance under the vehicle, such as vehicle 10. In some examples, mounting the HCU 102 directly above and/or at least a portion above the clutch 104 yields a very short clutch oil circuit, helping to improve the responsiveness of the clutch application circuit. In some instances, mounting the HCU 102 depicted in FIGS. 6 and 8 improves the stability of the vehicle 10 by putting the heavy weight of the AST 10 lower. Alternately, the underside of the chassis may be raised, which provides the vehicle 10 with more ground clearance in the area under the AST 42. Further, this gives better clearance for obstacles during extreme off-road maneuver. Additionally, locating the HCU 102 above the clutch 104 reduces the length of the hydraulic channels/lines going from the HCU 102 to the clutch 104. This improves the response time of the system, and reduces control lag.

Dual Shift Drum

Referring to FIGS. 3 and 6, the AST 42 includes a first gear selector 124 (e.g., a first shift drum) and a second gear selector 112 (e.g., a second shift drum). The second gear selector 112 is described above with reference to FIGS. 9-14, and the operation of the second gear selector 112 is described with reference to FIGS. 15-22.

Figure 23:
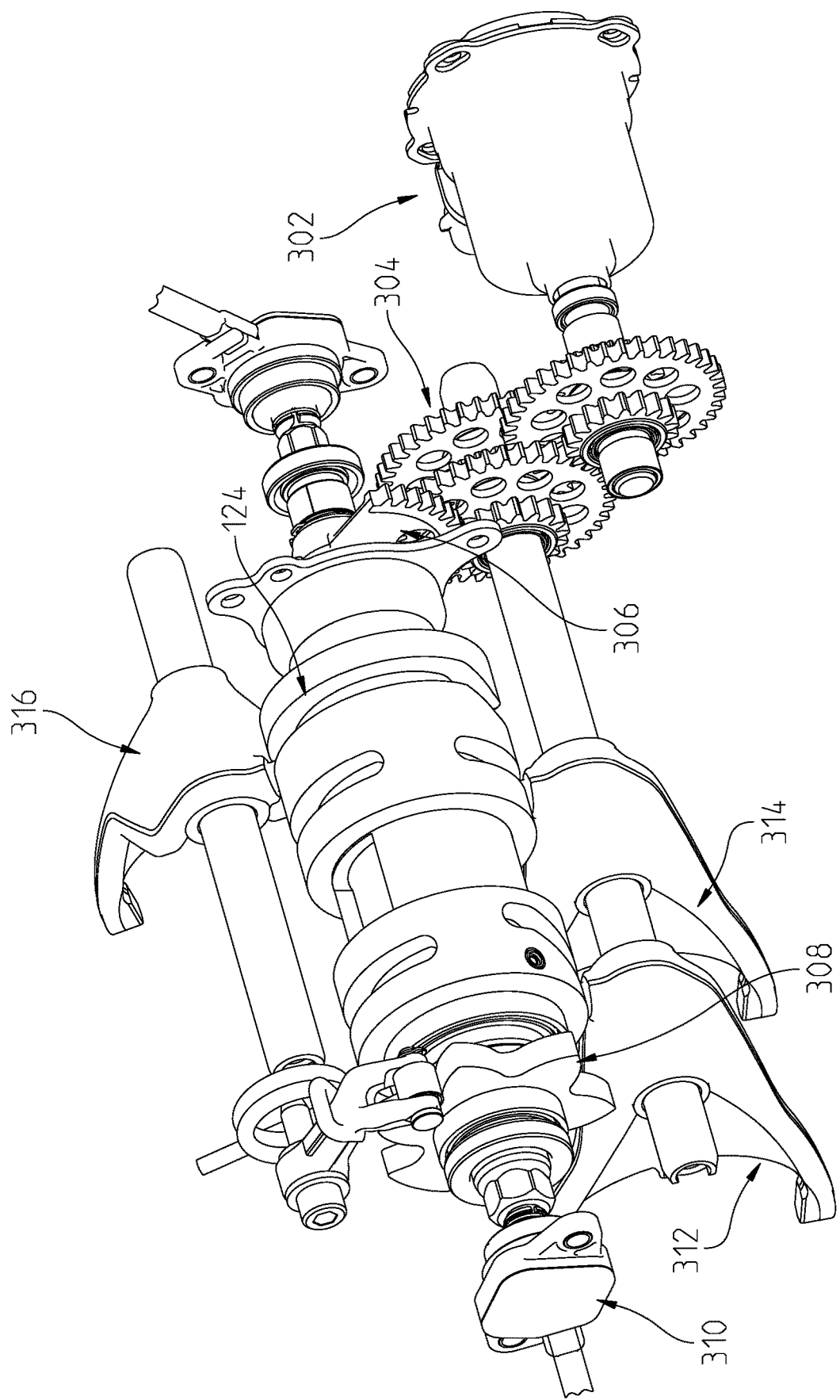
FIG. 23 shows a first perspective of a first gear selector of the AST.
Figure 24:
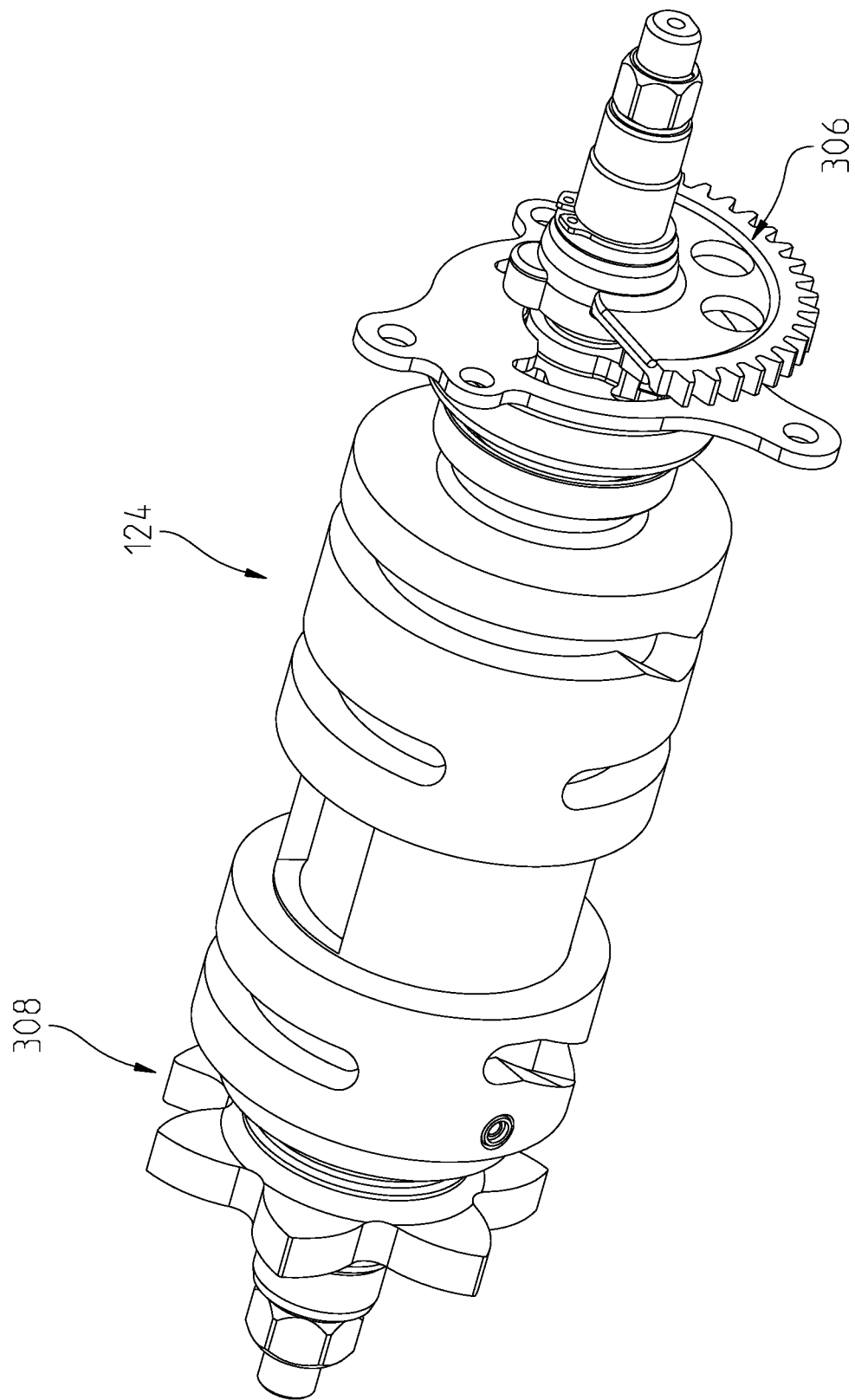
FIG. 24 shows a second perspective of the first gear selector of the AST.
Figure 25:
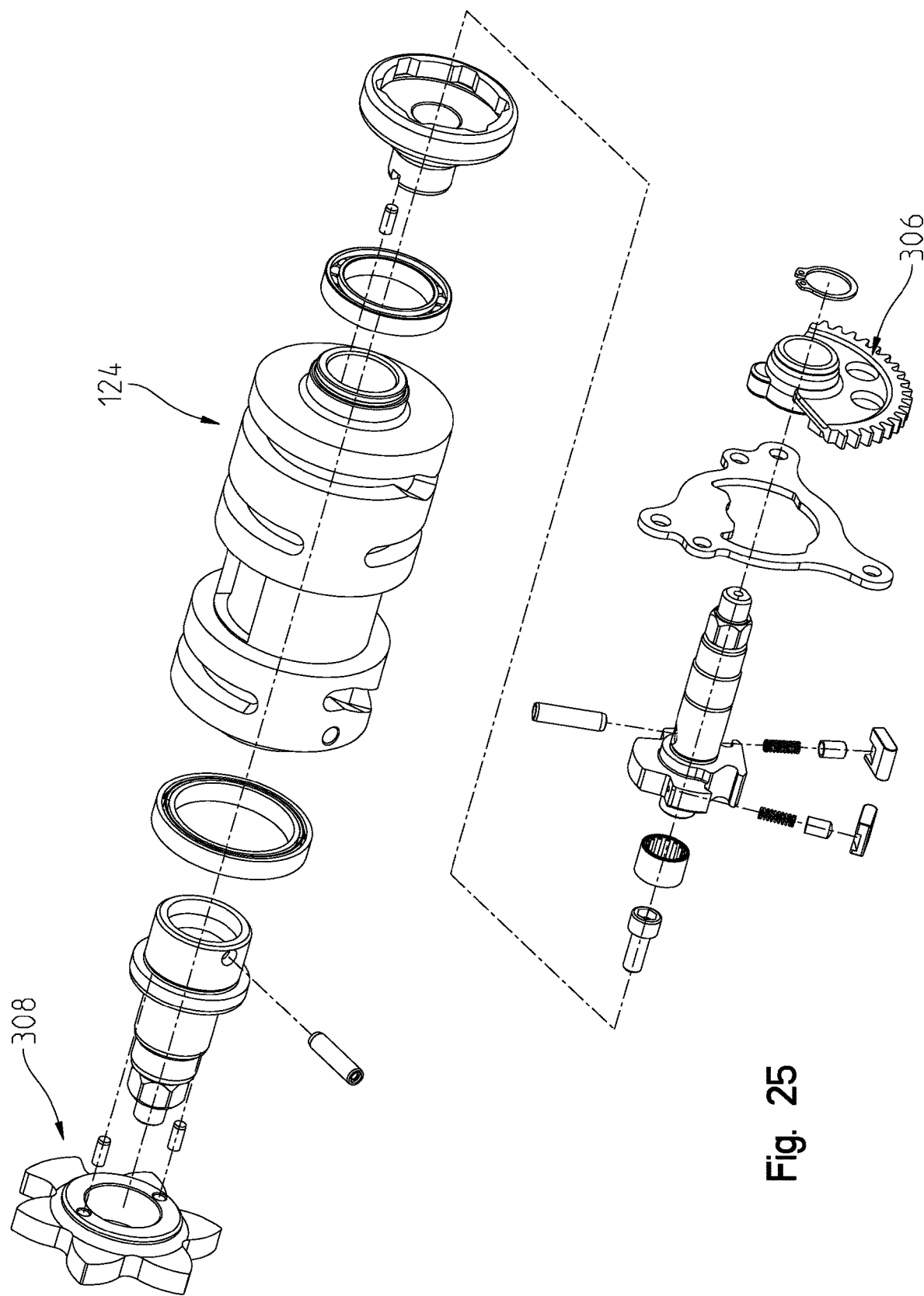
FIG. 25 shows an exploded view of the components of the first gear selector.

FIGS. 23-25 show the first gear selector 124. FIG. 24 shows a perspective of the first gear selector 124 and FIG. 25 shows an exploded view of the components of the first gear selector 124.

Referring to FIG. 23, the first actuator 302 functions similar to the second actuator 108 described above. Gears 304 are similar to the gears 202 described above, and gear 306 is similar to gear 238 described above. As such, the first actuator 302 is operatively coupled to one or more gears 304, and the one or more gears 304 are operatively coupled to gear 306. In operation, the actuator 302 receives user input and is configured to rotate or drive the gears 304 and 306. The gear 306 is part of and/or operatively coupled to the first gear selector 124. In other words, the first actuator 302 actuates or rotates the first gear selector 124 in response to a user input. In some examples, the first actuator 302 and the second actuator 108 may use different user inputs to shift to different gear positions. For example, the vehicle 10 may include a first user input (e.g., a handle or lever) to shift gear positions for the first actuator 302 and a second user input (e.g., a handle or lever) to shift gear positions for the second actuator 108.

As mentioned above, the first gear selector 124 selects one or more gear shift positions, such as the reverse gear position, the first gear position, the second gear position, the third gear position, the fourth gear position, and the fifth gear position. For example, after receiving each user input, the first gear selector 124 sequentially moves between gear positions, such as reverse, first, second, and so on. To perform the gear shifts, the first gear selector 124 has three indentations or tracks similar to the inner drum track 222. For example, the three shiftable members 312, 314, and 316, which operate similarly to shiftable member 210 described above, each includes a portion, such as a pin or knob. The portion is operatively coupled to a track of the first gear selector 124. After rotation of the first gear selector 124, the track guides or moves at least one of the shiftable members 312, 314, and 316 from a first position (e.g., center, left, or right position) to a second position (e.g., center, left, or right position).

In some examples, in a first gear shift position, the shiftable member 312 is engaged to a reverse gear (e.g., the interface of the shiftable member 312 is engaged to pegs in the reverse gear, which is not shown). In a second gear shift position, the shiftable member 312 is engaged to a first gear (not shown). In a third gear shift position, the shiftable member 314 is engaged to a second gear (not shown). In a fourth gear shift position, the shiftable member 314 is engaged to a third gear (not shown). In a fifth gear shift position, the shiftable member 314 is engaged to a fourth gear (not shown). In a sixth gear shift position, the shiftable member 314 is engaged to a fifth gear (not shown).

As mentioned previously, the AST 42 moves through gear positions in sequential order. As such, after each user input, the first actuator 302 may actuate the first gear selector 124 by one gear shift position. The mechanical arrangement 308 may function similarly to mechanical arrangement 204 such that each user input actuates the first gear selector 124 by one gear shift position. The sensor 310 is similar to sensor 214 and used to determine and/or provide information indicating the gear shift position of the first gear selector 124.

By separating the functions of the first gear selector 124 (e.g., first shift drum) and the second gear selector 112 (second shift drum), the high speed shifting functions are split from the low speed operations. The low speed operations or gear shift positions include high/low gear range selection, park lock selection, and neutral selection as described above. The high speed shifting functions or gear shift positions, as described above, include reverse gear position and first through fifth gear positions.

Further, by separating the high speed shifting functions from everything else, the shifting performance of the high speed shifting functions is increased by reducing the amount of compromises inherent in the design. For example, the design shown on FIG. 23 for the high speed drum 124 (e.g., the reverse, first, second, third, fourth and fifth gears) enables for extremely fast shifting. On functions such as a park system, the design should be the opposite (e.g., slow shifting). Park lock gear 208 (shown in FIGS. 9 and 31-36) is mechanically tailored to only physically engage below certain speeds for safety (e.g., ~3 MPH or below). Thus, the second gear selector 112 is designed for those requirements. If the park lock selection was on first gear selector 122, it would be very difficult to mechanically control the engagement speed without some other form of control or safety lockout to prevent high speed park engagement. The operation of the park lock gear 208 is described below.

Integrated Gear Set

Figure 26:
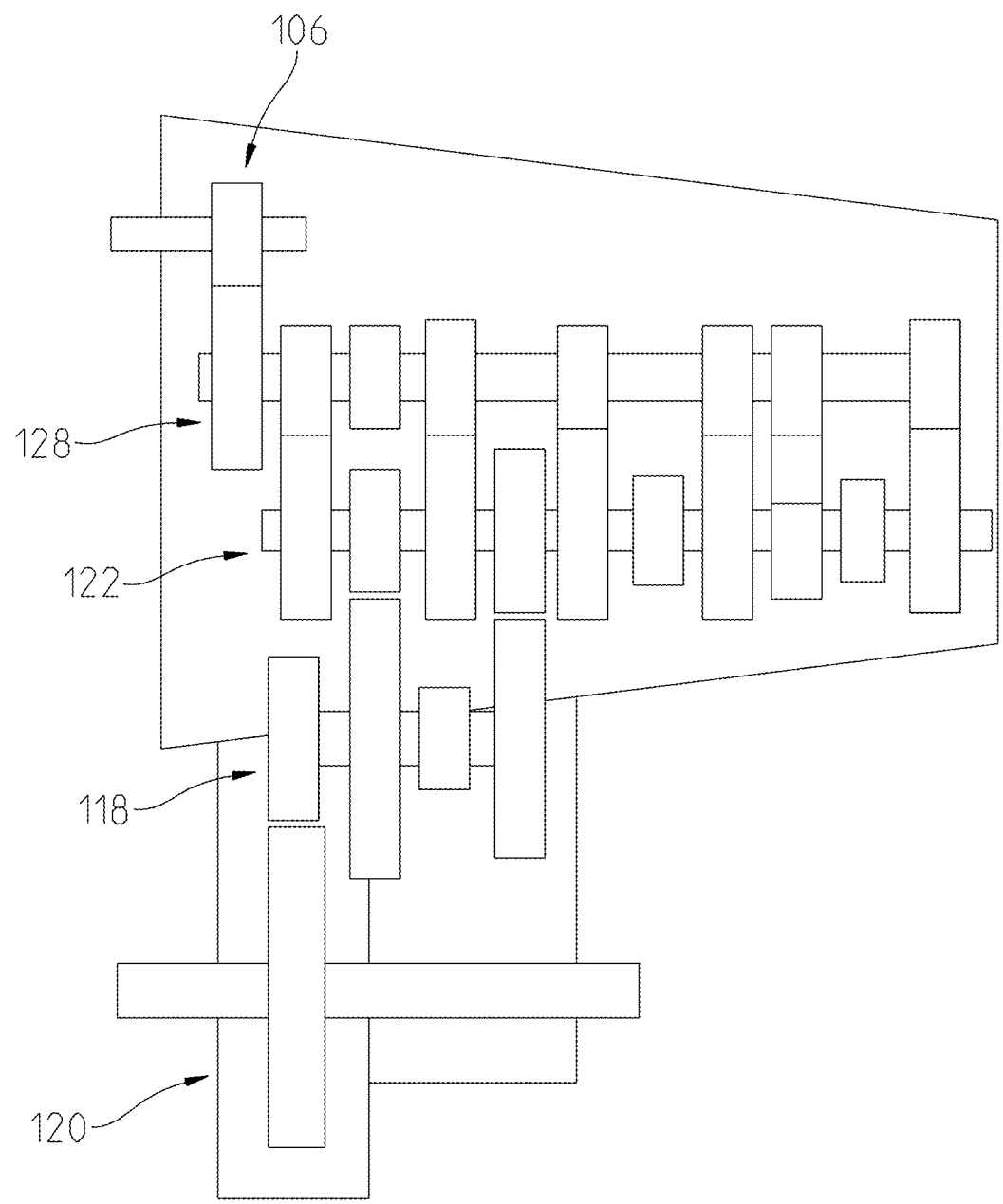
FIG. 26 shows a cross-sectional view of a plurality of gear sets.

Referring back to FIGS. 3 and 7, the AST 42 includes a first gear set 128, 122 and a second gear set 118. The first gear set includes two gear sets, gear set B 128 and gear set C 122. Each gear set includes one or more gears and one or more shafts (e.g., shaft B, shaft C, and second gear set shaft). The gears interact and/or are operatively coupled to the shaft of their corresponding gear set. FIG. 26 shows a cross-section of gear set B 128, gear set C 122, and the second gear set 118. Further, FIG. 26 shows the input 106 and the output 120. As shown, gear set B 128, gear set C 122, second gear set 118, input 106, and output 120 are positioned parallel to each other. Further, the second gear set 118 is positioned between a first end of gear set B 128 and a second end of gear set B 128.

As mentioned previously, gear set B 128 is operatively coupled to a gear from the input 106 and is configured to be driven by the input 106. Further, gear set B 128 includes at least a reverse gear for the reverse gear shift position, a first gear for the first gear shift position, a second gear for the second gear shift position, a third gear for the third gear shift position, a fourth gear for the fourth gear shift position, and a fifth gear for the fifth gear shift position.

The gear set B 128 is operatively coupled to gear set C 122. Gear set C 122 is operatively coupled to the second gear set 118. The second gear set 118 includes at least a park gear 208 for a park gear shift position, a neutral gear shift position, a high gear 228 for a high gear shift position, and/or a low gear 226 for a low gear shift position. The second gear set 118 is operatively coupled to the output 120.

By positioning the gear sets in this way, the high and low gear (gear trains) 228, 226 are positioned downstream to the reverse and forward ratio gear trains (e.g., first through fifth gears). Further, positioning the gear sets in this way causes the second gear set 118 to be positioned between the first and second ends of gear set B 128. Thus, the AST 42 nests the high/low gears 228 and 226 next to the reverse and forward ratio gear trains so they will fit in the same gearbox case.

By using the same gearbox for the gear sets B, C, and the second gear set 128, 122, and 118, the gearbox axial length is reduced and the shaft of gear set C 122 carries both the output of gear set B 128 and the input of the second gear set 118. Additionally, the total housing envelope for the gearbox that carries these gear sets is reduced, and the range box output is located closer to the engine 40.

Low Inertia Clutch

The AST 42 that shifts using a non-synchronized sequential method is sensitive to shift noise generated from the impact of dog rings with a target gear. For example, referring to FIG. 11, even if an alignment occurs between holes 232 of the interface 230 (e.g., dog ring) and the target gear 226, noise may be generated based on engagement. Further, even if the operator or a controller opens the clutch 104 to perform a gear shift, the sum of the kinetic energy from the clutch plates to the interface 230 creates the noise. For example, an AST 42 uses protrusions (e.g., dogs or pegs) to lock the gear, such as gear 226, to a shaft. In order to work at high rotational speeds, there is usually a decent amount of clearance between the dog and mating pocket, such as between dog 234 and mating pocket 232. When the parts (e.g., interface 230 and gear 226) are at different relative rotating speeds, one spins until it catches up and contacts the other part. This contact is transferring kinetic energy and depending on just how much relative speed and inertia is in the AST 42 will create higher impact noises, otherwise known as clunk.

Figure 27:
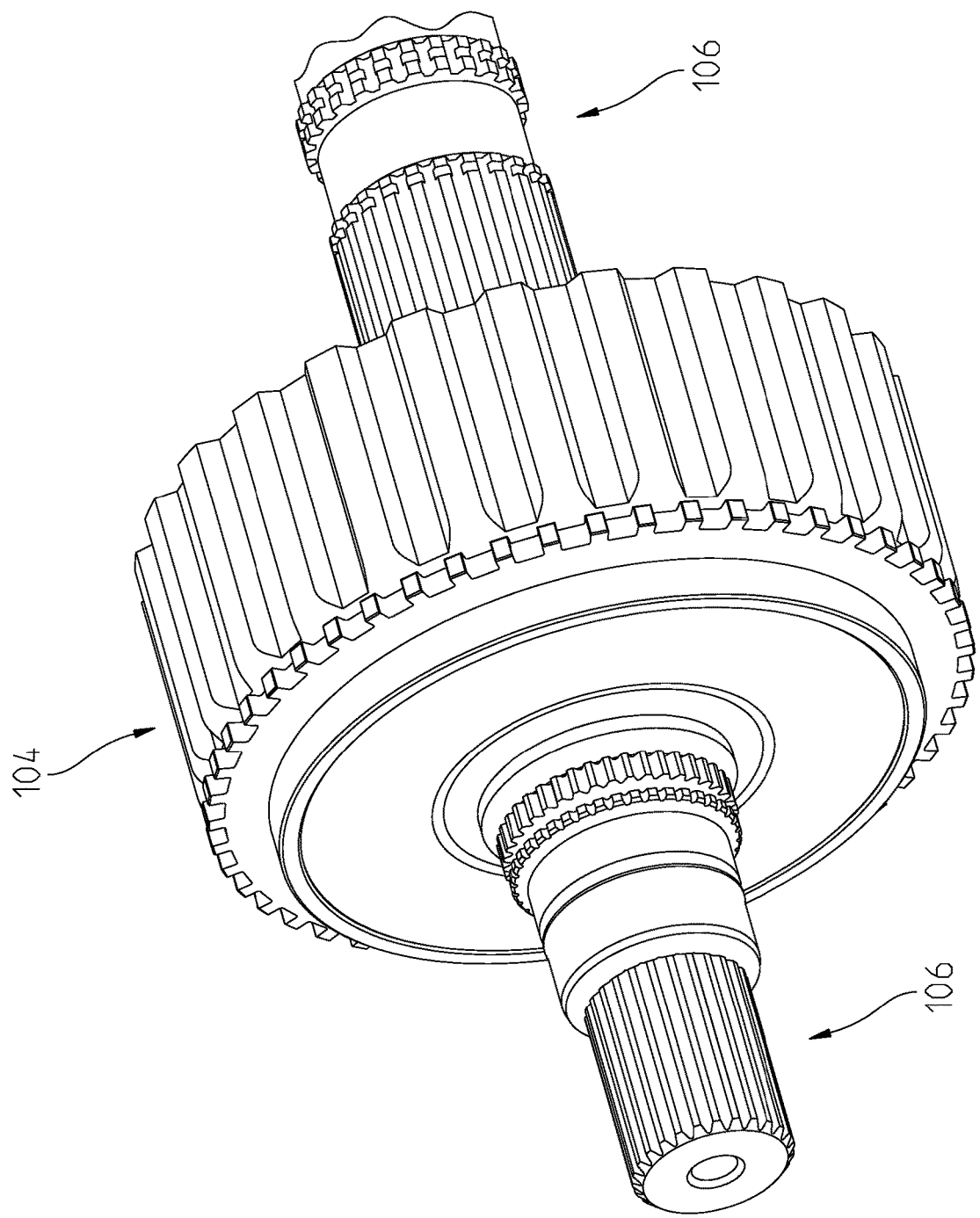
FIG. 27 shows a side perspective of a clutch and an input shaft of the AST.
Figure 28:
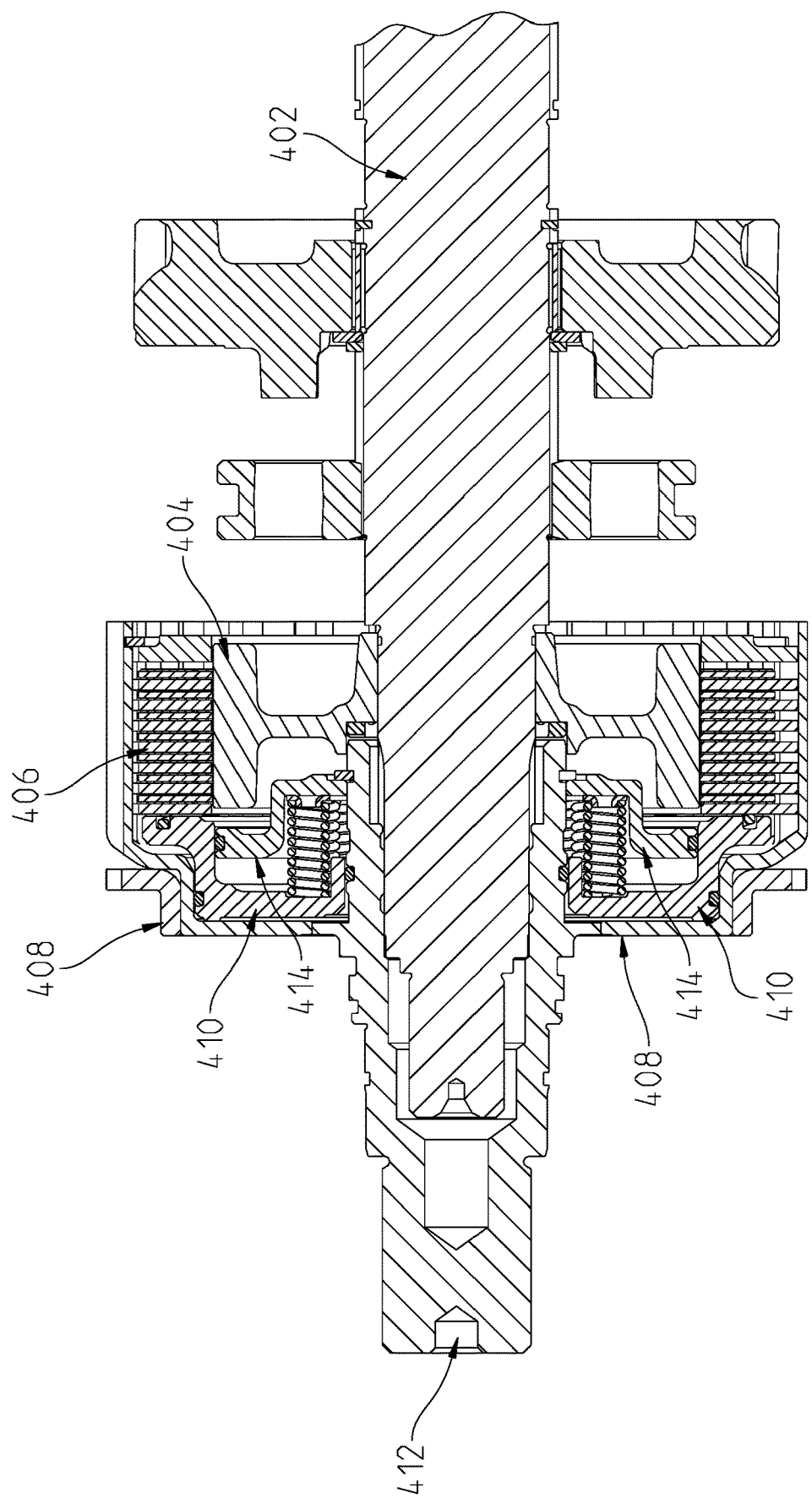
FIGS. 28-30 show a clutch 104 and an oil pump drive system.

As such, as shown in FIG. 28, rearranging the components of the clutch 104 to minimize the inertia between the clutch friction plates and the dog ring contact (e.g., interface 230), results in lower the noise from gear shifts. The position of the clutch 104 and the input shafts 106 in the AST 42 is shown in FIG. 8. A side perspective of the clutch 104 and the input shafts is shown in FIG. 27.

Referring to FIG. 28, input 106 includes an input clutch shaft 412 and an output clutch shaft 402. For example, as mentioned previously, the input 106 may include two shafts. The input clutch shaft 412 may be operatively coupled to shaft 56 of the engine 40 (shown in FIG. 3). The output clutch shaft 402 may be operatively coupled to the first set of gears 122.

The clutch output friction plates 406 is operatively coupled to the clutch output hub 404. The clutch basket 408 is operatively coupled to the clutch apply piston 410. The clutch piston reaction plate 414 is operatively coupled to the clutch apply piston 410.

By designing the clutch 104 as shown in FIG. 28, most of the components are located towards the input portion of the clutch (e.g., towards opening 402 for the input clutch shaft). For example, the clutch basket 408, shafting (not shown), seals (not shown), clutch apply piston 410, and the clutch piston reaction plate 414 are all on the input portion of the clutch. Further, in some instances, only the clutch output friction plates 406 and the clutch output hub 404 contribute to inertia during a normal open-clutch gear shift.

Oil Pump Drive System

Figure 29:
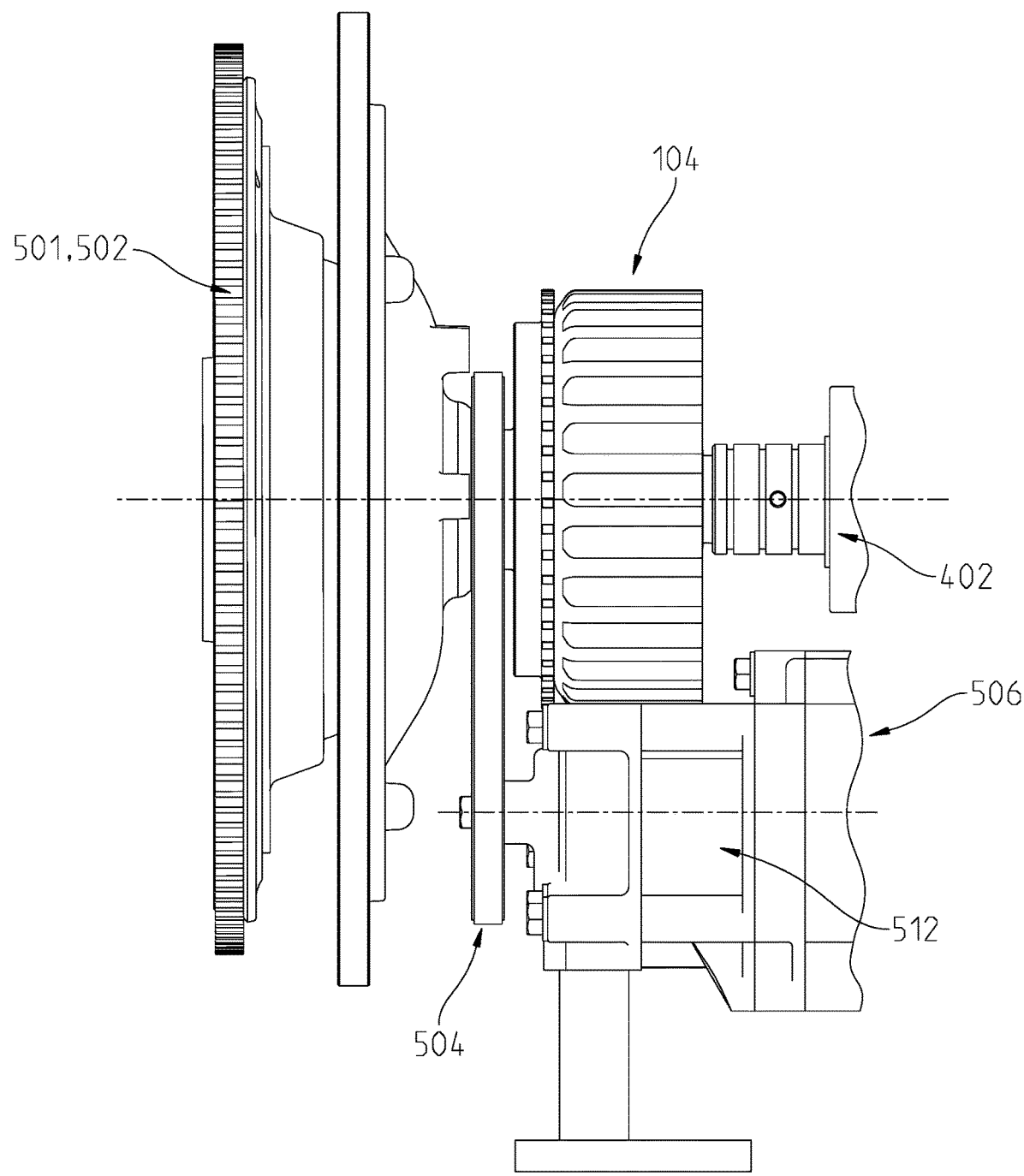
Figure 30:
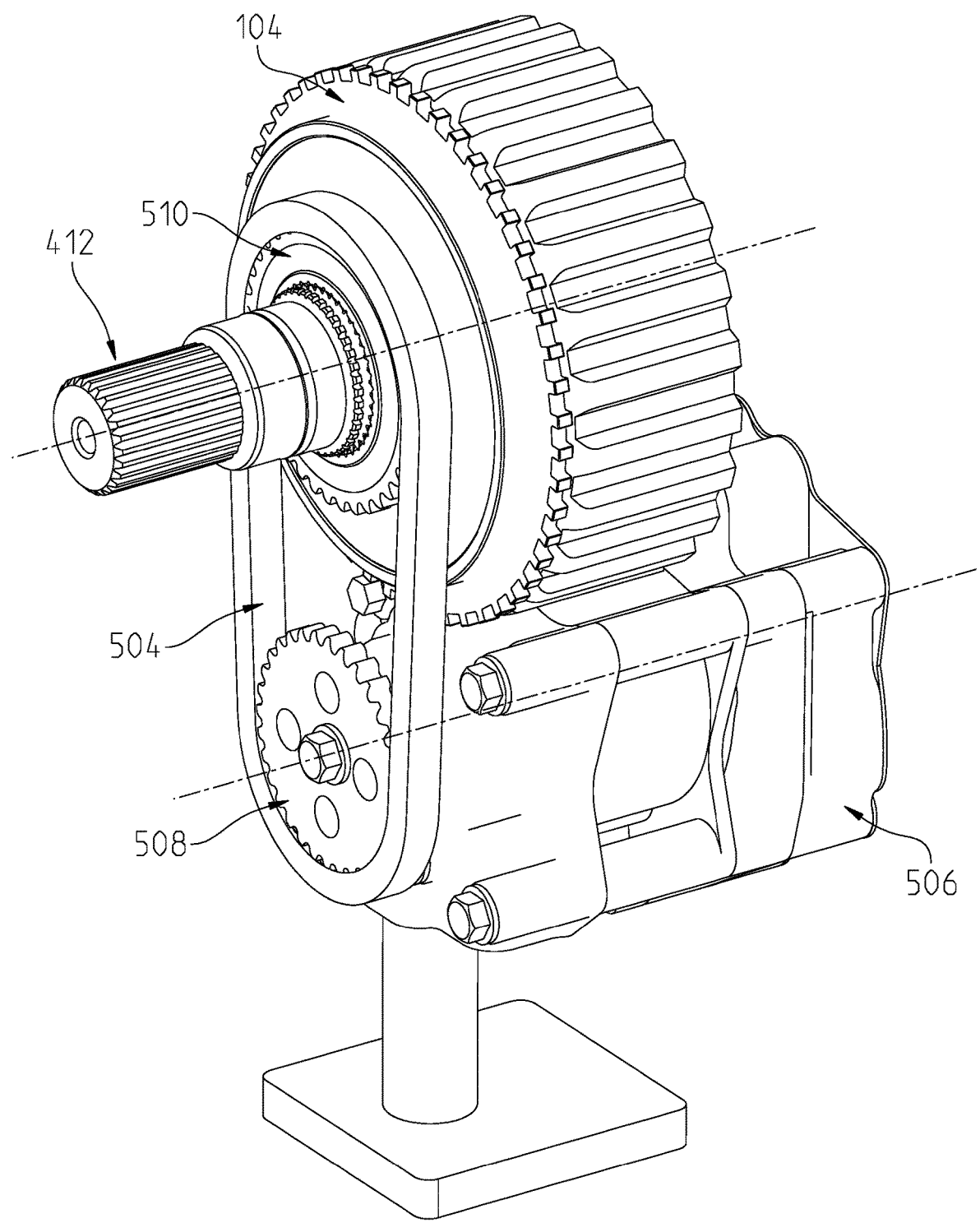
Figure 31:
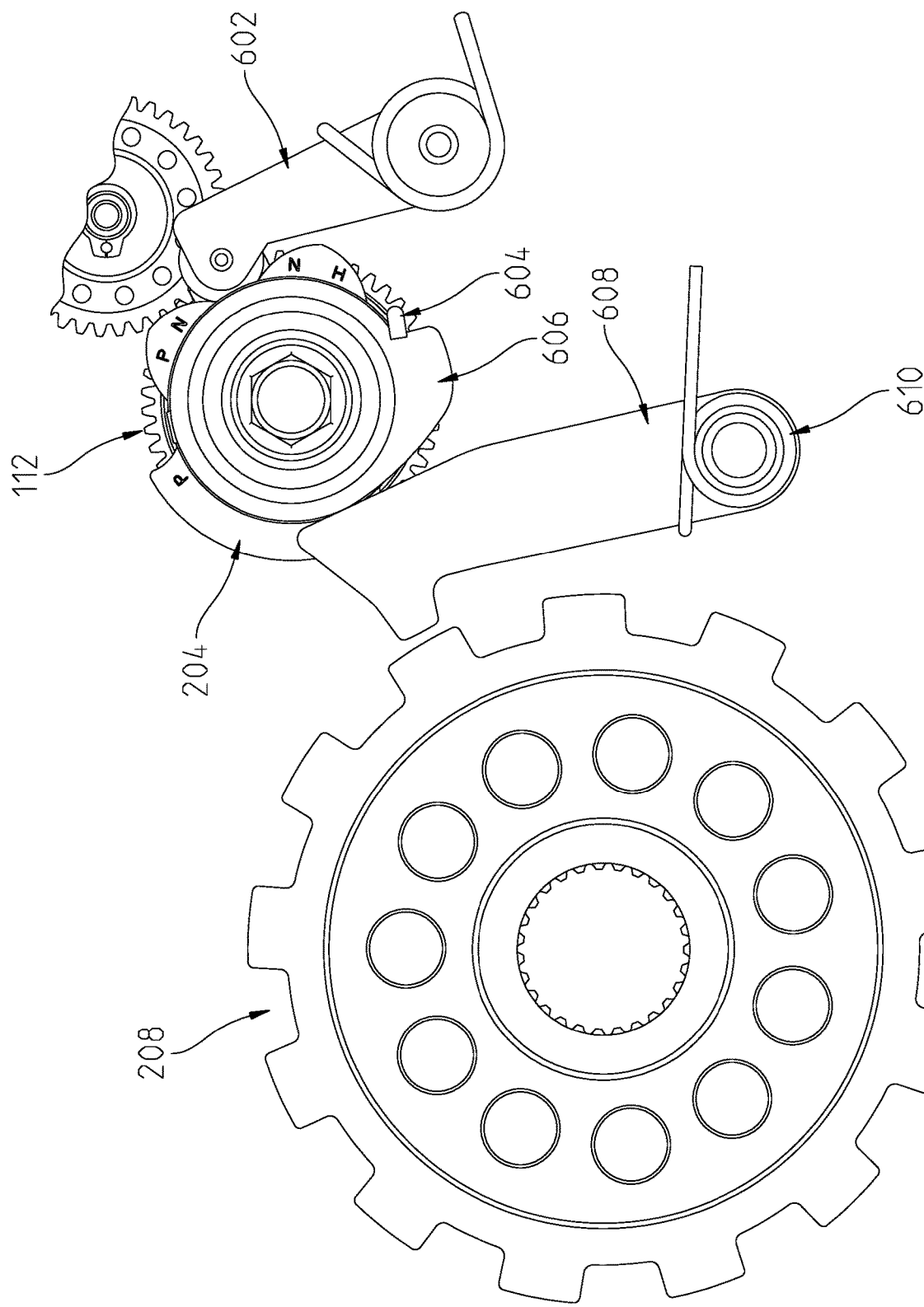
FIGS. 31-36 show a cross-sectional perspective of the AST and in particular, a cross-sectional view of a park lock gear and a second gear selector.

FIGS. 28-30 show a clutch 104 and an oil pump drive system. For example, the AST 42 may be a Hydraulic or Electro-Hydraulic transmission, and requires oil pressure to operate the clutch 104. Thus, referring to FIG. 30, the AST 42 includes an oil pump 506 driven off the input 412 of the clutch to get oil pressure whenever the engine 40 is rotating. Using a chain and sprocket set 504, 508, 510 driven in front of the clutch (e.g., the input 412) between the clutch plates 406 and the engine 40 allows the AST 42 to receive the operating pressure needed while simultaneously mounting the oil pump 506 alongside the clutch 104, creating a more axial space efficient layout.

FIGS. 28 and 29 show a position of the oil pump drive system relative to the clutch 104. Referring to FIG. 29, the oil pump 506 is positioned directly below the clutch 104. Further, the flywheel 501 and damper 502 of the AST 42 is positioned near and upstream from the oil pump 506 and the chain 504. The output 402 of the clutch 104 is positioned downstream from the oil pump 506 and chain 504. As shown in FIG. 30, the chain 504 is operatively coupled to the input 412 of the clutch 104. Additionally, two sprockets (e.g., a driven member 508 and a driving member 510) operatively couple the input 412 to the chain 510. The driven member 508 is operatively coupled to the pump 506.

In operation and referring to FIG. 28, the engine 40 drives the output 56, which drives the input shaft 412 of the clutch 104. In normal operation, the input shaft 412 drives the output shaft 402 of the clutch. When a gear shift occurs and the clutch 104 is disengaged, the input shaft 412 of the clutch 104 is disconnected from the output shaft 402 such that the input shaft 412 does not drive the output shaft 402. In some examples, components of the AST 42, such as the clutch 104 may use oil for lubrication even during gear shift events and when the clutch 104 is disengaged. Referring to FIG. 30, the driving member (sprocket) 510 is operatively coupled to the input shaft 412 and drives the driven member (sprocket) 508 using the chain 504. Thus, even when the clutch 104 is disengaged, the input shaft 412 continues to rotate and the driven and driving members 508 and 510 continue to rotate. The driven member 508 is operatively coupled to the oil pump 506 and rotates a shaft 512 (shown in FIG. 29) of the oil pump 506. In other words, when the clutch 104 is disconnected or disengaged, the oil pump shaft 512 may continue to rotate and the oil pump 506 may continue to pump oil. Further, as shown in FIGS. 29 and 30, since the chain 504 permits the oil pump 506 to run off-axis, the oil pump 506 is able to be positioned next to the clutch 104 to minimize the length increase when adding the oil pump 506 to the AST 42.

Park Lock Gear Operation

FIGS. 31-36 show a cross-sectional perspective of the AST 42 and in particular, show a cross section of the park lock gear 208 and the second gear selector 112 from the right side of FIG. 9. FIGS. 31-36 will be used to describe an operation of engaging a park lock gear, such as the park lock gear 208.

In operation, a controller, such as an engine control module (ECM), an engine control unit (ECU), and/or a transmission control unit (TCU), may control operation of the park lock gear 208. For example, referring to FIG. 31, the controller (e.g., TCU) may determine whether it is safe to engage the vehicle 10 in a park mode based on user inputs and/or sensor inputs. In some instances, the controller may determine it is safe to engage the park mode based on the vehicle speed and/or a position of an accelerator pedal. In other words, the controller may receive the vehicle speed from a vehicle speed sensor and/or a position of an accelerator pedal from a pedal position sensor. If the vehicle speed is below a certain threshold (e.g., 3 miles per hour) and/or the accelerator pedal is not pressed, then the controller may determine it is safe to engage the park mode.

Figure 32:
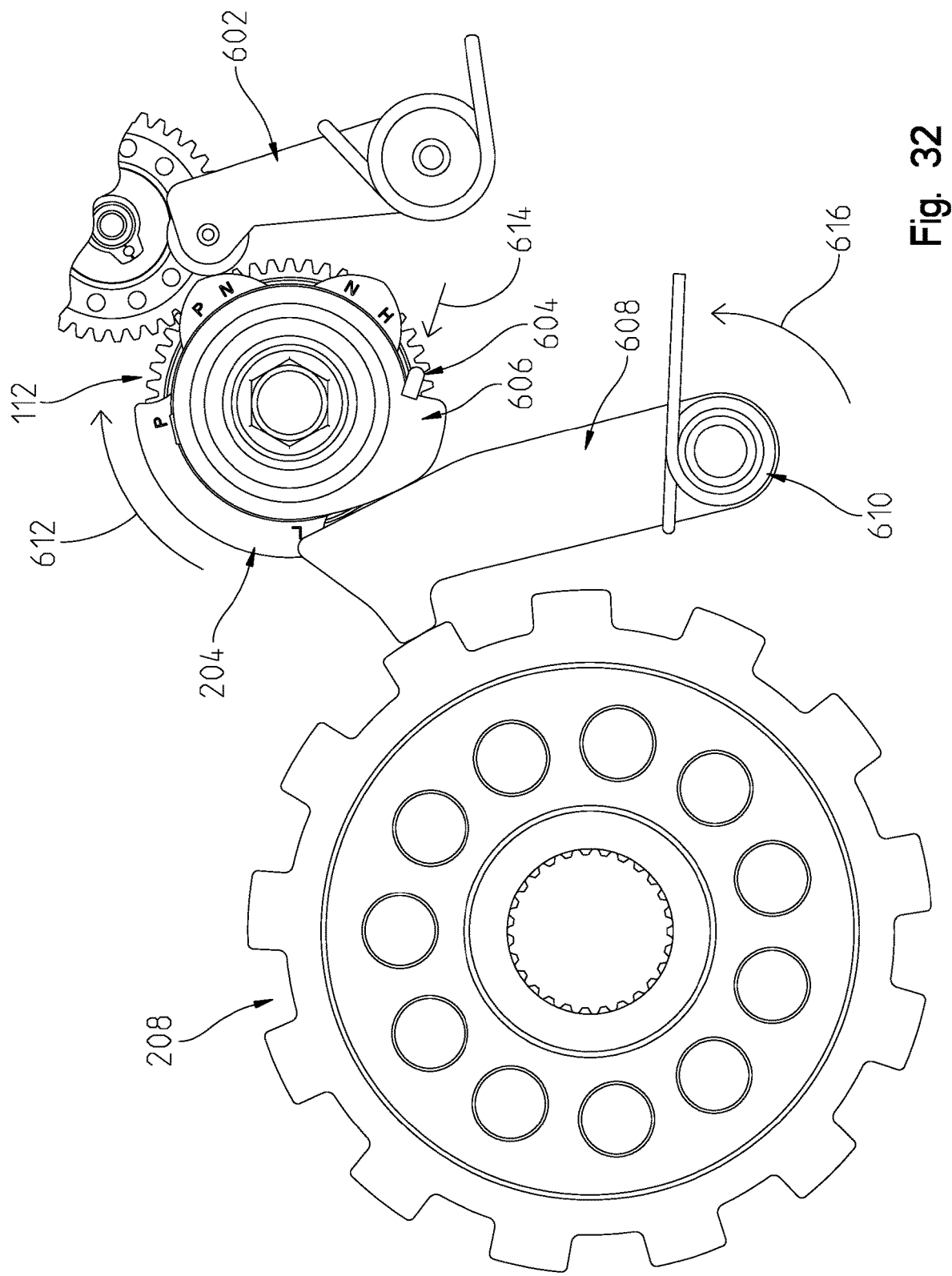

Referring to FIG. 32, the controller may provide one or more signals to control and/or move/rotate a gear shift selector such as the second gear shift selector 112. For example, FIG. 32 shows the components of the AST 42 when the vehicle 10 is stopped and the park 608 is not in alignment with a tooth of the park lock gear 208. In such examples, as shown by direction arrow 612, the controller may provide one or more signals to an actuator, such as actuator 108 (shown in FIG. 9), to rotate the second gear shift selector 112 (e.g., drum). Rotation of the second gear shift selector 112 causes the cam spring 604 to rotate with the second gear shift selector 112 shown by direction arrow 614. This rotation of the cam spring 604 causes the park pawl 608 to rotate as shown by direction arrow 616. The park pawl 608 continues to rotate until it touches the outer diameter of a gear tooth of the park lock gear 208.

Figure 33:
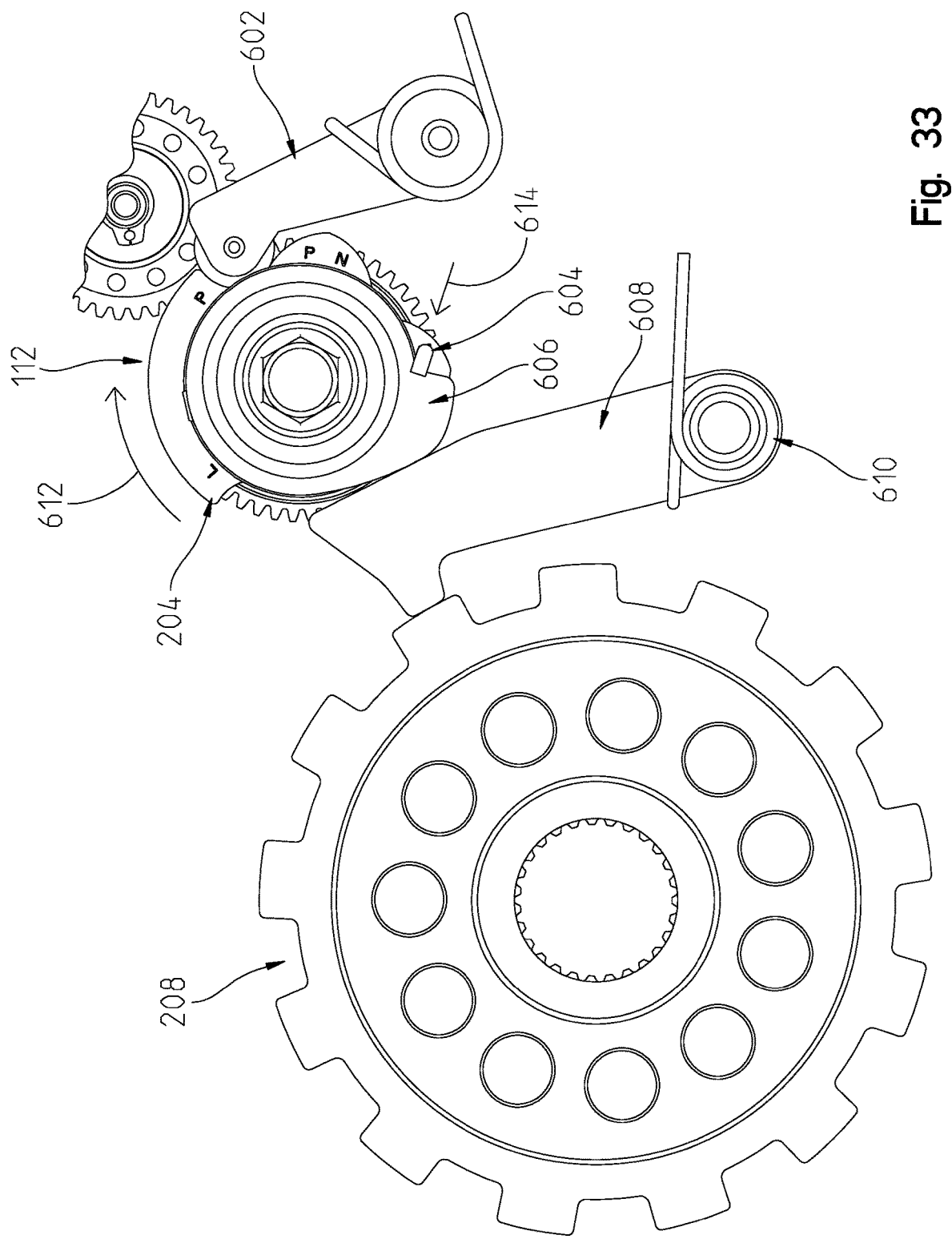

Referring to FIG. 33, the controller may continue rotating the second gear shift selector 112 until a park position on the detent star 204 is reached. The cam spring 604 allows the park cam 606 to stop moving while the second gear shift selector 112 continues to rotate. This results in an increased preload on the cam spring 604. In other words, if the park cam 606 is prevented from rotation by the park pawl 608 hitting the top of the tooth of the park gear 208, the gear selector 112 may continue to rotate to the next position since the park cam 606 is actually engaged by the cam spring 604. When the park pawl 608 tops out and the selector 112 keeps turning, this winds up the cam spring 604 with preload. If the vehicle rolls while the park system is in this preloaded state, the preload may then rotate the park cam 606 and thus push the park pawl 608 into the pocket of the park gear 208 once the tooth of the park pawl 608 lines up with the space between the gear teeth on the park gear 208, thus engaging the park system and preventing the vehicle from rolling.

Figure 34:
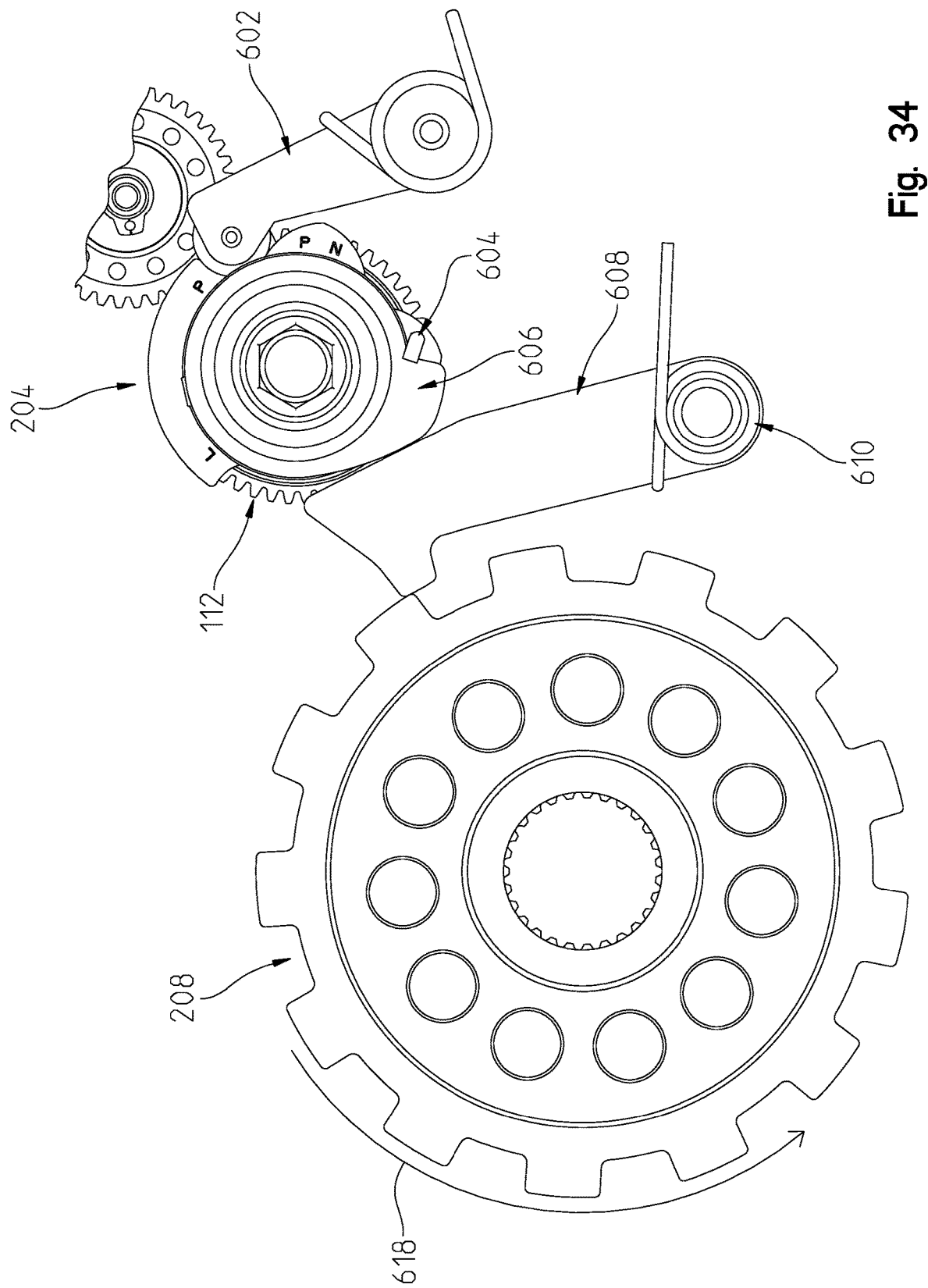

Referring to FIG. 34, the operator of the vehicle 10 may remove their foot from the brake pedal, which allows some motion of the vehicle 10 due to gravity or external influences. Due to this, the park lock gear 208 rotates as shown by direction arrow 618. In other words, when the brake pedal is not actuated, the brakes may be released from the plurality of ground engaging members 12, 14. This may allow some rotation of the output 120 due to gravity or external influences, which may cause the park lock gear 208 to rotate as shown by direction arrow 618.

Figure 35:
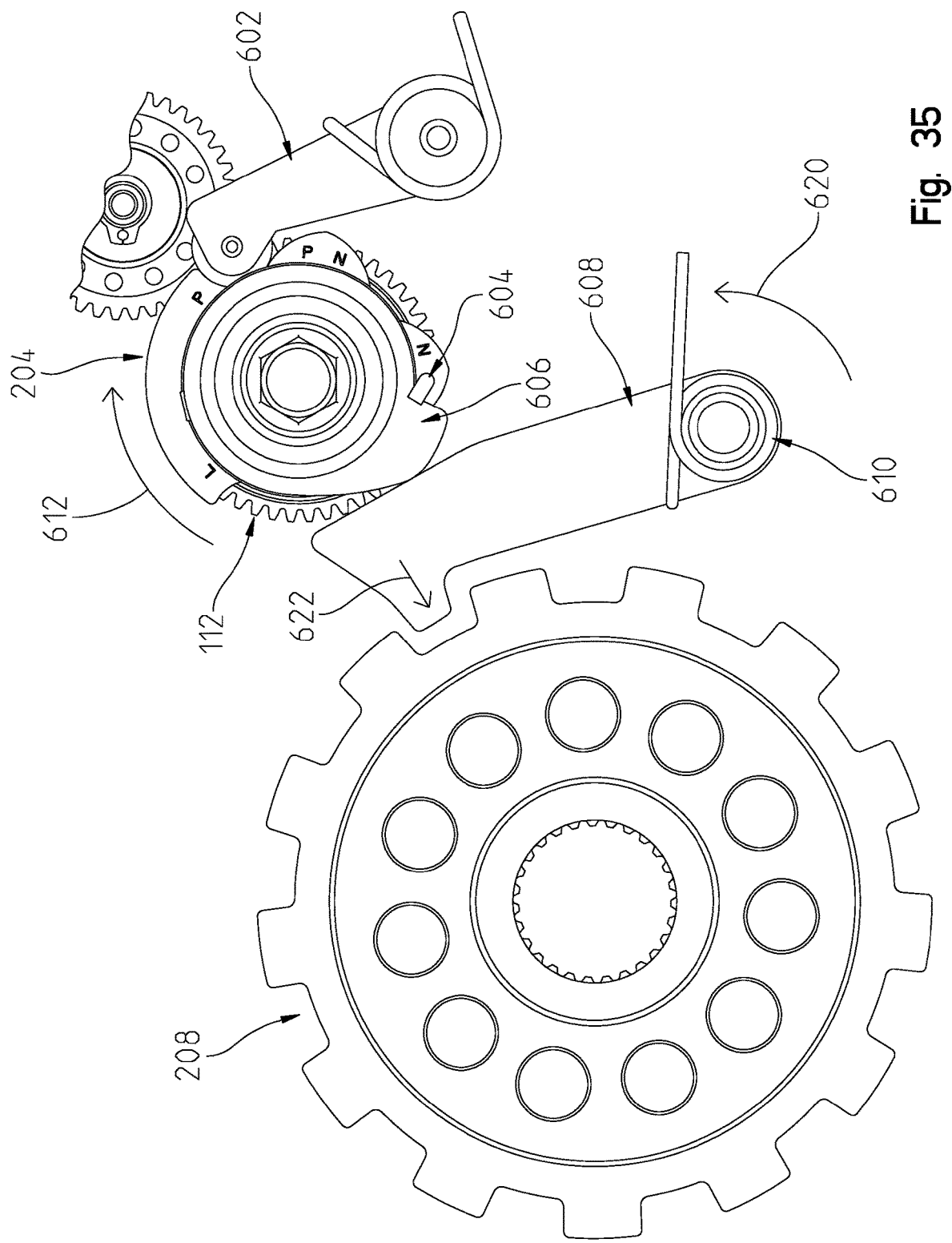

Referring to FIG. 35, when sufficient rotation of the park lock gear 208 occurs due to the brakes being released from the plurality of ground engaging members 12, 14, an opening (e.g., a gap between two gear teeth) may be present in the park lock gear 208 for the park pawl 608. The preload on the cam spring 604 forces the park pawl 608 to rotate and engage with the park lock gear 208.

Figure 36:
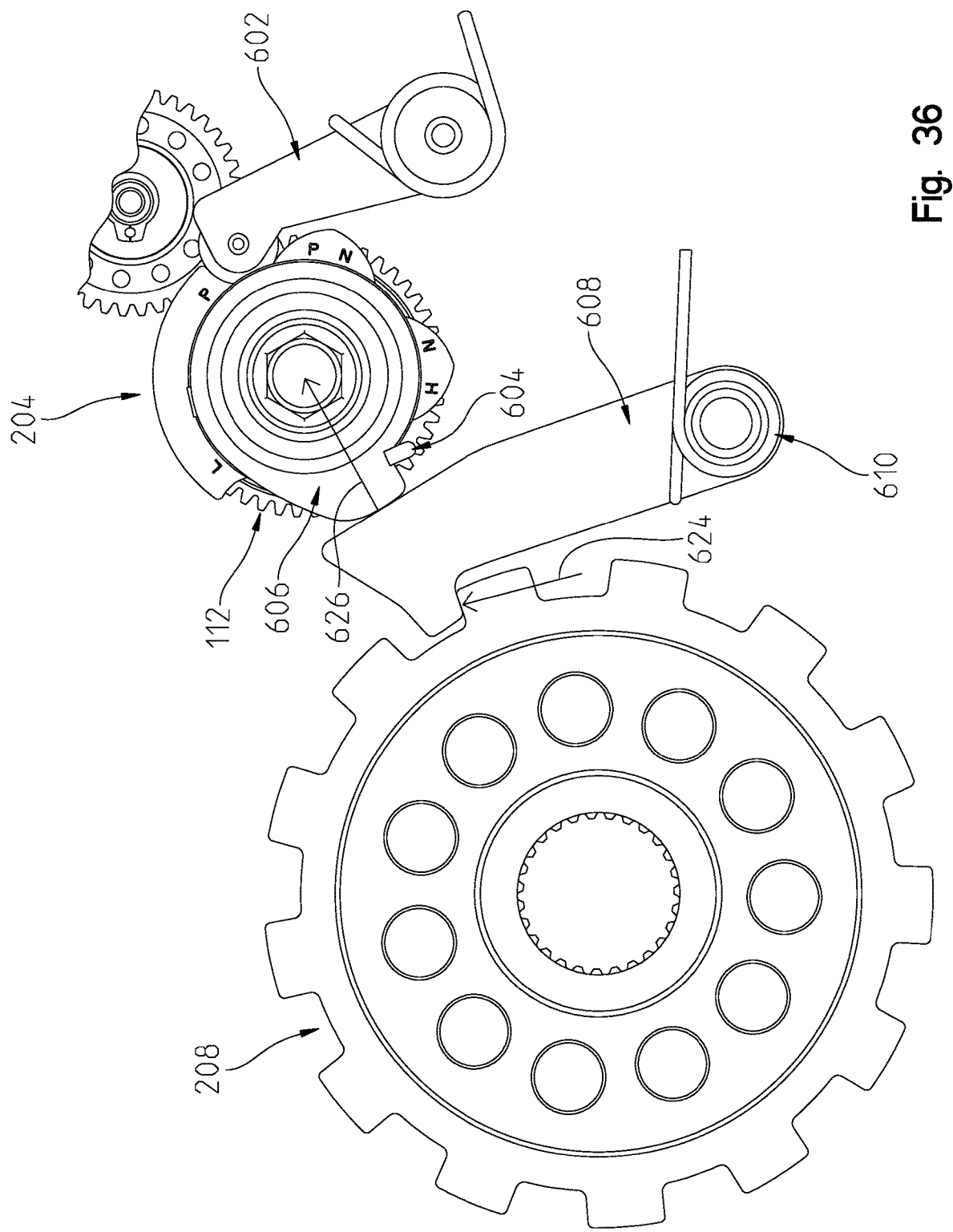

Referring to FIG. 36, due to the park pawl 608 engaging with the park lock gear 208, the second shift gear selector 112 continues to rotate until it is no longer able to due to the park pawl 608 engagement. The tooth of the park pawl 208 meets with the side of the park lock gear 208 and prevents further rotation of the output 120. Then, the park cam 606, in a final position, has a flat surface to control the reaction load as shown by the direction arrow 626, which keeps the park cam 606 from rotating in the reverse direction.

Figure 37:
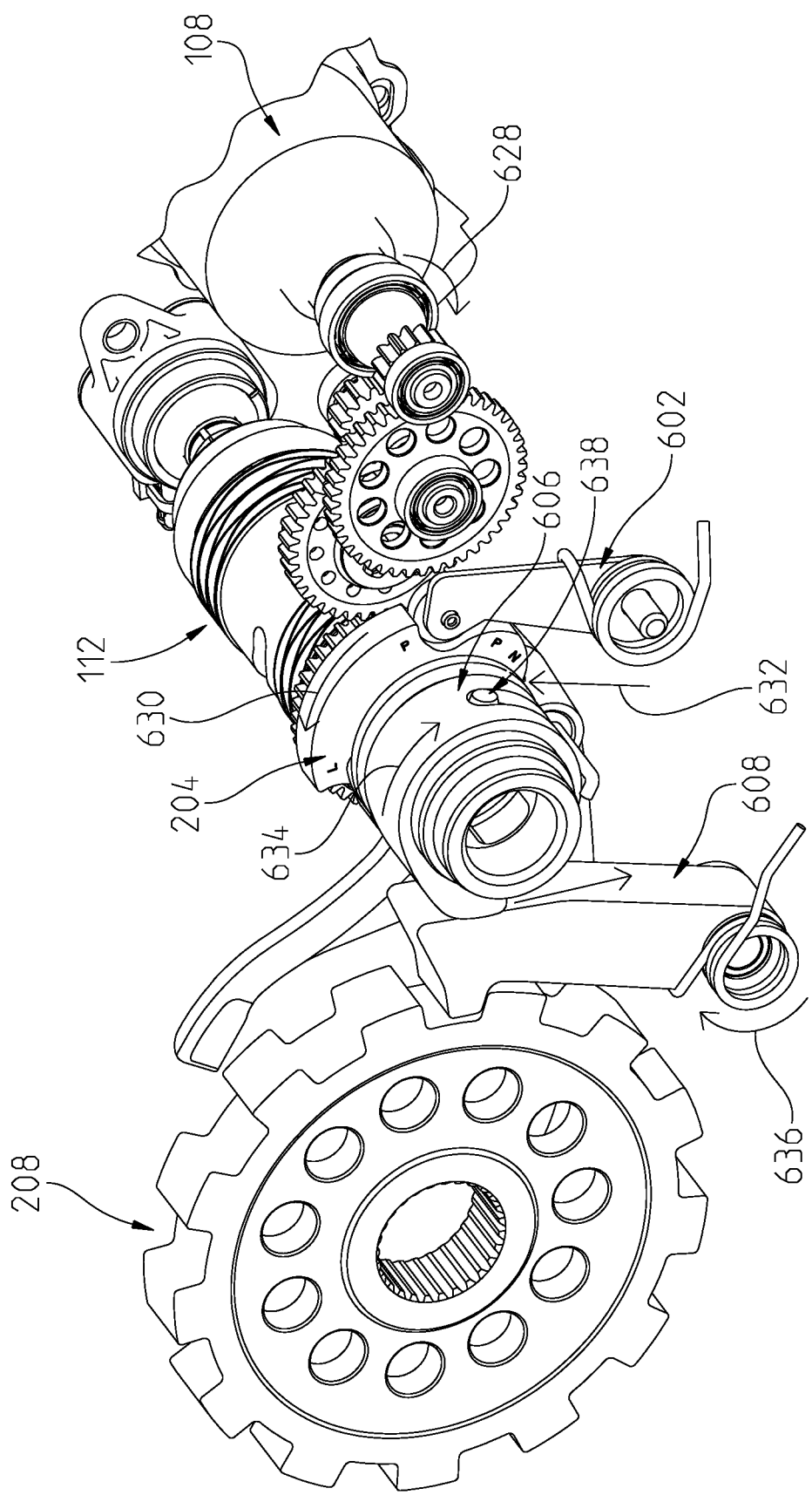
FIG. 37 shows another perspective of the AST and in particular, shows another perspective the park lock gear and the second gear selector.

FIG. 37 shows another perspective of the AST 42 and in particular, shows another perspective the park lock gear 208 and the second gear selector 112 from FIG. 9. FIG. 37 will be used to describe an operation of disengaging a park lock gear, such as the park lock gear 208. For example, the park release is directly driven by the actuator 108 through a dowel pin 638.

In operation, based on one or more signals from the controller, the actuator 108 turns the clockwork (e.g., gears 201, 202, and/or 238) as shown by direction arrow 628. The clockwork rotates the second gear shift selector 112 as shown by direction arrow 630. The second gear shift selector 112 applies a load to the park cam 606 through the dowel pin 638 as shown by direction arrow 632. The park cam 606 rotates out of the way of the park pawl 608 as shown by direction arrow 634. The park pawl 608 may self-release due to the angle of the pawl tooth and the pawl release spring 610.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An automated sequential transmission (AST), comprising:
   a plurality of gears;
   a first gear selector including a first gear selector interface to operatively coupled couple the first gear selector to a first subset of gears of the plurality of gears and the first gear selector configured to rotate between a first plurality of gear shift positions, wherein each gear shift position of the first plurality of gear shift positions corresponds to the engagement of the first gear selector, via the first gear selector interface, with a gear of the first subset of gears; and
   a second gear selector including a second gear selector interface to operatively coupled couple the second gear selector to a second subset of gears of the plurality of gears and the second gear selector configured to rotate between a second plurality of low speed gear shift positions, wherein each gear shift position of the second plurality of gear shift positions corresponds to the engagement of the second gear selector, via the second gear selector interface, with a gear of the second subset of gears,
   wherein the first subset of gears is directly coupled to the second subset of gears.

2. The AST of claim 1, further comprising:
   a first shiftable member operably coupled to the first gear selector, wherein the first shiftable member comprises a first interface that engages with a reverse gear, of the first subset of gears of the plurality of gears, in response to the first gear selector being in a reverse gear shift position, of the first plurality of gear shift positions of the first gear selector.

3. The AST of claim 2, wherein the first interface disengages with the reverse gear in response to the first gear selector moving from the reverse gear shift position, of the first plurality of gear shift positions, to a different gear shift position of the first plurality of gear shift positions other than the reverse gear shift position.

4. The AST of claim 2, wherein the first interface of the first shiftable member engages with a first forward gear, of the first subset of gears of the plurality of gears, in response to the first gear selector being in a first forward gear shift position, of the first plurality of gear shift positions of the first gear selector.

5. The AST of claim 4, wherein the first interface of the first shiftable member disengages with the first forward gear, of the first subset of gears of the plurality of gears, in response to the first gear selector moving from the first forward gear shift position, of the first plurality of gear shift positions, to a different gear shift position of the first plurality of gear shift positions of the first gear selector other than the first forward gear shift position.

6. The AST of claim 2, further comprising:
a second shiftable member operably coupled to the second gear selector, wherein the second shiftable member comprises a second interface that engages with a park gear, of the second subset of gears of the plurality of gears, in response to the second gear selector being in a park gear shift position, of the second plurality of gear shift positions of the second gear selector.

7. The AST of claim 6, wherein the second interface disengages with the park gear, of the second subset of gears of the plurality of gears, in response to the second gear selector moving from the park gear shift position, of the second plurality of gear shift positions of the second gear selector, to a different gear shift position of the second plurality of gear shift positions of the second gear selector other than the park gear shift position.

8. The AST of claim 6, further comprising an input and an output, the plurality of gears selectively coupled between the input and the output, wherein the output is able to move independent of the input in response to the second gear selector being in a neutral gear shift position, of the second plurality of gear shift positions of the second gear selector.

9. The AST of claim 1, wherein the first subset of gears of the plurality of gears comprises a reverse gear, a first forward gear, a second forward gear, a third forward gear, a fourth forward gear, and a fifth forward gear, and wherein the first plurality of gear shift positions of the first gear selector comprises a reverse gear shift position, a first forward gear shift position, a second forward gear shift position, a third forward gear shift position, a fourth forward gear shift position, and a fifth forward gear shift position.

10. The AST of claim 9, wherein the second subset of gears of the plurality of gears comprises a park gear, a high range gear, a low range gear, and wherein the second plurality of gear shift positions of the second gear selector comprises a park gear shift position, a neutral speed gear shift position, a high range speed gear shift position, and a low range speed gear shift position.

11. The AST of claim 1, further comprising:
a first shift actuator operatively coupled to the first gear selector and configured to rotate the first gear selector in response to a first control input; and
a second shift actuator operatively coupled to the second gear selector and configured to rotate the second gear selector in response to a second control input.

12. The AST of claim 1, further comprising a first shaft coupled to the first subset of gears of the plurality of gears and a second shaft coupled to the second subset of gears of the plurality of gears.

13. The AST of claim 12, wherein the first shaft is an input shaft and the second shaft is an output shaft.

14. The AST of claim 1, wherein the first gear selector and the second gear selector are non-coaxial.

15. The AST of claim 1, wherein the first subset of gears and the second subset of gears are non-coaxial.

16. An automated sequential transmission (AST), comprising:
an input;
a first shaft;
a second shaft;
a first gearset supported by the first shaft, the first gearset operably coupled to the input, the first gearset comprising a reverse gear and at least a first forward gear;
a second gearset supported by the second shaft, the second gearset directly operably coupled to the first gearset, the second gearset comprising a parking gear;
an output coupled to the second gearset and coupled to the first gearset through the second gearset;
a first shift drum including a first gear selector interface to operatively couple the first shift drum to the first gearset, the first shift drum configured to rotate between a plurality of positions to selectively engage, via the first gear selector interface, a first gear of the first gearset with the first shaft; and
a second shift drum including a second gear selector interface to operatively couple the second shift drum to the second gearset, the second shift drum configured to rotate between a plurality of positions to selectively engage, via the second gear selector interface, a first gear of the second gearset with the second shaft.

17. The AST of claim 16, further comprising a third gearset supported by a third shaft and operably coupled between the first gearset and the input, the third gearset comprising at least a second forward gear, and the second shift drum operatively coupled to the third gearset, the second shift drum configured to rotate between the plurality of positions to selectively engage the second forward gear with the third shaft.

18. The AST of claim 16, wherein the first shaft is vertically offset from the second shaft.

19. The AST of claim 16, further comprising a first actuator operable to rotate the first shift drum and a second actuator operable to rotate the second shift drum.

* * * * *